(12) United States Patent
Hayashi

(10) Patent No.: US 8,555,175 B2
(45) Date of Patent: Oct. 8, 2013

(54) DISPLAY GENERATION DEVICE, DISPLAY GENERATION METHOD, PROGRAM, AND CONTENT DOWNLOAD SYSTEM

(75) Inventor: Morihiko Hayashi, Kanagawa (JP)

(73) Assignee: Sony Corporation (JP)

(*) Notice: Subject to any disclaimer, the term of this patent is extended or adjusted under 35 U.S.C. 154(b) by 276 days.

(21) Appl. No.: 12/450,143

(22) PCT Filed: Dec. 25, 2008

(86) PCT No.: PCT/JP2008/073561
§ 371 (c)(1),
(2), (4) Date: Sep. 10, 2009

(87) PCT Pub. No.: WO2009/087907
PCT Pub. Date: Jul. 16, 2009

(65) Prior Publication Data
US 2010/0107078 A1    Apr. 29, 2010

(30) Foreign Application Priority Data
Jan. 10, 2008  (JP) .............................. P2008-003543

(51) Int. Cl.
*G06F 3/00* (2006.01)
(52) U.S. Cl.
USPC ........................ 715/748; 715/716; 725/148
(58) Field of Classification Search
USPC ..................... 715/744, 748, 716; 725/148
See application file for complete search history.

(56) References Cited

U.S. PATENT DOCUMENTS

| 2003/0074379 A1* | 4/2003 | Keohane et al. .............. 707/205 |
| 2004/0128293 A1 | 7/2004 | Maeda |
| 2004/0267952 A1 | 12/2004 | He et al. |
| 2007/0061725 A1* | 3/2007 | Isaac et al. .................... 715/717 |
| 2008/0040760 A1 | 2/2008 | Cho et al. |

FOREIGN PATENT DOCUMENTS

| JP | 11225311 A | 8/1999 |
| JP | 2001-008203 A | 1/2001 |
| JP | 2002-262267 A | 9/2002 |
| JP | 2002290948 A | 10/2002 |
| JP | 2003-018527 A | 1/2003 |
| JP | 2004048635 A | 2/2004 |

(Continued)

OTHER PUBLICATIONS

Supplementary European Search Report EP 08869318, dated May 6, 2011.
Office Action from Japanese Application No. 2008-003543, dated Sep. 27, 2011.

*Primary Examiner* — Namitha Pillai
(74) *Attorney, Agent, or Firm* — Lerner, David, Littenberg, Krumholz & Mentlik, LLP

(57) ABSTRACT

A display generation device, a display generation method, a program, and a content download system are provided. The display generation device for generating a display screen including one or two or more user-selectable playback control items is provided with a download section for downloading content data from a content server storing the content data, a data amount acquisition section for acquiring a data amount already downloaded and a data amount not yet downloaded by the download section among the content data, a rate acquisition section for acquiring a transmission rate of data from the content server to the display generation device, and a display screen generation section for generating the display screen including the playback control item according to the data amount acquired by the data amount acquisition section and the transmission rate acquired by the rate acquisition section.

13 Claims, 15 Drawing Sheets

(56) References Cited

FOREIGN PATENT DOCUMENTS

| | | | |
|---|---|---|---|
| JP | 2004-229060 A | 8/2004 | |
| JP | 2005333478 A | 12/2005 | |
| JP | 2006279320 A | 10/2006 | |
| JP | 2008278090 A | 11/2008 | |
| WO | 0027106 A2 | 5/2000 | |
| WO | WO-03/034727 A1 | 4/2003 | |
| WO | 2005032115 A2 | 4/2005 | |

* cited by examiner

FIG. 6
| CONTENT ID | TITLE | GENRE | PLAYING TIME | COMMENTARY | THUMBNAIL | DATA SIZE |
|---|---|---|---|---|---|---|
| 5347 | VAST OCEAN | SPORTS | 30m00s | 2008/1/22... | 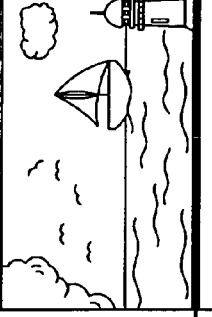 | 2.2GB |
| 2398 | TOWN BY THE LAKE | OTHERS | 4m37s | LAKE xx IS... | 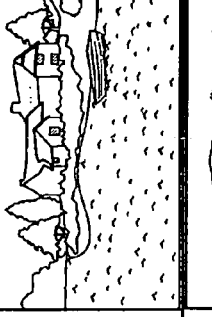 | 1.6GB |
| 0897 | AFRICAN WILDERNESS | EDUCATION | 17m34s | IN AFRICA, ... | 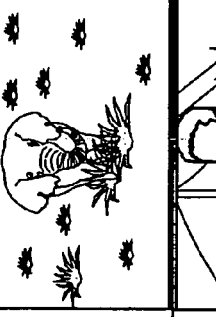 | 4.0GB |
| 8878 | TOKYO BUSINESS | NEWS | 15m00s | RECENTLY, IN TOKYO, ... | 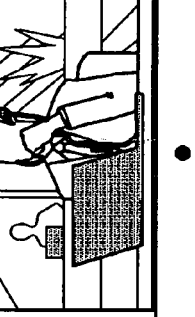 | 1.0GB |
| ... | ... | ... | ... | ... | ... | ... |

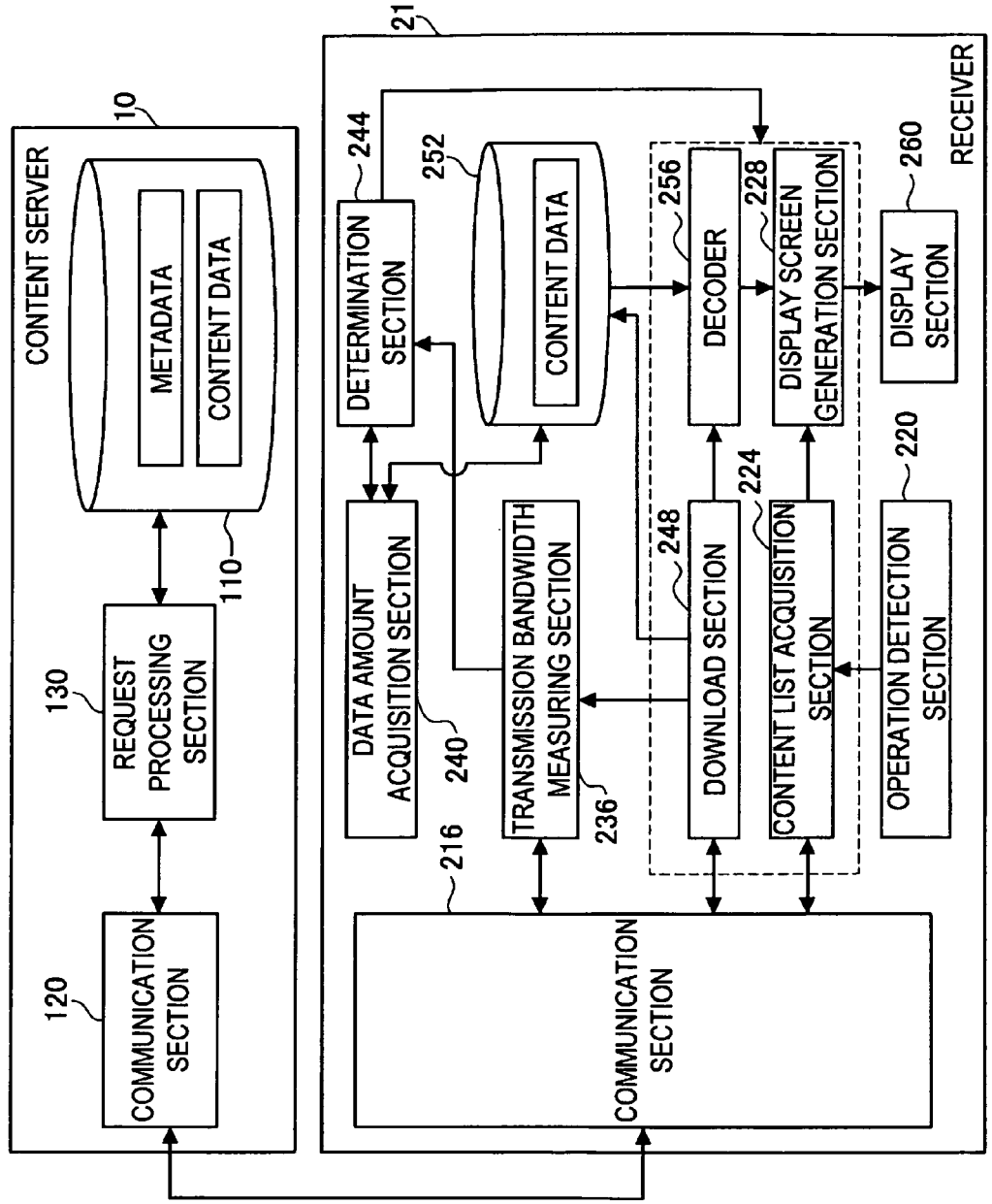

DISPLAY GENERATION DEVICE, DISPLAY GENERATION METHOD, PROGRAM, AND CONTENT DOWNLOAD SYSTEM

CROSS-REFERENCES TO RELATED APPLICATIONS

The present application is a national phase entry under 35 U.S.C. §371 of International Application No. PCT/JP2008/073561 filed on Dec. 25, 2008, published on Jul. 16, 2009 as WO 2009/087907 A1, which claims priority from Japanese Patent Application No. JP 2008-003543 filed in the Japanese Patent Office on Jan. 10, 2008.

TECHNICAL FIELD

The present invention relates to a display generation device, a display generation method, a program, and a content download system.

BACKGROUND ART

Recently, content provider services providing content data such as video data and music data via the Internet are widespread. Such content provider services are realized by a reception device possessed by a user displaying content data currently acquirable and acquiring the content data selected by the user via the display from a content server.

Here, the reception device can acquire the content data from the content server by downloading, for example. In case of downloading, the reception device acquires the entire content data via the Internet, and starts the playback of the content data after storing the content data in a built-in storage medium. Accordingly, the reception device can playback high-quality content data regardless of the data acquisition rate.

On the other hand, as described in Patent Document 1, for example, a method for playing back content data already downloaded while downloading the content data has been proposed. Such a method is effective in that the playback can be started without waiting for the entire content data to be stored in the storage medium of the reception device.
[Patent Document] JP-A-2002-262267

DISCLOSURE OF THE INVENTION

Problems to be Solved by the Invention

However, with the conventional method, when the playback rate of content data exceeds the download rate of the content data, inconveniences, such as the playback being interrupted, the playback not being able to be started until a predetermined amount of content data is downloaded, and the like, are assumed. Furthermore, the reception device merely displayed a fixed display screen including playback control items, such as a download start button, a playback start button and the like. As a result, there has been a problem that, against the intention of a user, the content data is not properly played back regardless of the playback start button being selected by the user.

Accordingly, the present invention is achieved in view of the above-described problems, and an object of the invention lies in providing a display generation device, a display generation method, a program and a content download system that are new and improved, and that are capable of flexibly changing playback control items included in a display screen.

Means for Solving the Problems

In order to solve the above-described problems, according to an aspect of the present invention, there is provided a display generation device for generating a display screen including one or two or more user-selectable playback control items, including a download section for downloading content data from a content server storing the content data, a data amount acquisition section for acquiring a data amount already downloaded and a data amount not yet downloaded by the download section among the content data, a rate acquisition section for acquiring a transmission rate of data from the content server to the display generation device, and a display screen generation section for generating the display screen including the playback control item according to the data amount acquired by the data amount acquisition section and the transmission rate acquired by the rate acquisition section.

With this configuration, the display screen generation section generates the display screen including the playback control item according to the data amount acquired by the data amount acquisition section and the transmission rate acquired by the rate acquisition section. Accordingly, the display screen generation section can flexibly change the playback control item included in the display screen as the data amount already downloaded by the download section increases, for example.

The display generation device may further include a determination section for determining a relationship between remaining download time obtained based on the data amount not yet downloaded by the download section as well as on the transmission rate and playing time of the content data, and the display screen generation section may generate the display screen including, as the playback control item, a playback instruction item for instructing playback of the content data when the determination section determines that the remaining download time fell below the playing time of the content data.

Here, it can be assumed that, when the playback of the content data is started after the remaining download time fell below the playing time of the content data, a data playback position of the content data will not catch up with a data download position and the playback can be performed to the end without any interruption. Accordingly, the display screen generation section can generate the display screen including the playback instruction item after the content data becomes capable of being played back to the end without any interruption. As a result, cases can be suppressed where a situation not intended by the user occurs, such as playback being not started or interrupted even though the user desired a proper playback of the content data and selected the playback instruction item.

The remaining download time may be longer by a predetermined time than a time obtained by dividing the data amount not downloaded by the download section by the transmission rate. With this configuration, the display screen generation section generates the display screen including the playback instruction item when a time which is a time obtained by dividing the data amount not downloaded by the transmission rate and adding the predetermined time falls below the playing time of the content data. Accordingly, even in a case where the playback instruction item is selected at the time the display screen including the playback instruction item is generated and the playback of the content data is started, the content data is properly played back to the end as long as the actual download time of the content data does not exceed the time which is the time obtained by dividing the data amount not downloaded by the transmission rate and adding the predetermined time.

The display generation device may further include a playback section for playing back the content data downloaded by the download section, wherein the determination section determines, during the playback of the content data by the playback section, a relationship between remaining playing time of the content data and the remaining download time, and the display screen generation section generates the display screen including, as the playback control item, a fast-forward instruction item for instructing fast-forwarding of the content data when the determination section determines that the remaining playing time is longer by a predetermined time or more than the remaining download time. With this configuration, the display screen generation section generates the display screen including the fast-forward instruction item at the time it is determined that the playback will be completed after a predetermined time or more from the completion of download in a case the playback is continued as is.

The determination section may determine, during the fast-forwarding of the content data, a relationship between the remaining playing time of the content data and the remaining download time, and the playback section may stop the fast-forwarding of the content data when the determination section determines that difference between the remaining playing time and the remaining download time fell below a standard time. Here, the playback of the content data is possibly interrupted if shifted from fast-forwarding to playback at a normal rate after the difference between the remaining playing time and the remaining download time fell below the standard time. Accordingly, the proper playback of the content data to the end can be maintained by the playback section stopping the fast-forwarding of the content data as described above.

A playback section for playing back the content data downloaded by the download section may further be included, wherein the display screen generation section may generate, when the playback section is being used, the display screen not including the playback instruction item even when the determination section determines that the remaining download time fell below the playing time of the content data. With this configuration, since the playback instruction item is not displayed while the playback section is being used for another purpose and the playback section cannot be used for the playback of the content data, a case where the playback is not started although a user has selected the playback instruction item can be suppressed.

The display generation device may further include a display section for displaying the display screen generated by the display screen generation section. With this configuration, since a connecting section for connecting an external display device and the display generation device need not necessarily be provided in the display generation device, the configuration can be simplified according to an aspect.

The display generation device may further include the connecting section to be connected to a display device for displaying the display screen generated by the display screen generation section. With this configuration, the display generation section can be connected with an arbitrary display device in a wired or wireless manner, and the display screen generated by the display screen generation section can be displayed on the connected display device. Accordingly, the display screen generated by the display screen generation section can be displayed on an existing display device if the existing display device and the display generation device are connected with each other.

The playback control item may include the playback instruction item for instructing playback of the content data, and the display screen generation section may generate a menu screen including the playback instruction item.

The playback control item may include a fast-forward instruction item for instructing fast-forwarding of the content data, and the display screen generation section may add the fast-forward instruction item to a playback screen of the content data downloaded by the download section.

Furthermore, in order to solve the above-described problems, according to another aspect of the present invention, there is provided a display generation method to be executed in a display generation device for generating a display screen including one or two or more user-selectable playback control items, including the steps of downloading content data from a content server storing the content data, acquiring a data amount already downloaded and a data amount not yet downloaded among the content data, acquiring a transmission rate of data from the content server to the display generation device, and generating the display screen including the playback control item according to the data amount already downloaded, the data amount not yet downloaded and the transmission rate acquired by the rate acquisition section.

Furthermore, in order to solve the above-described problems, according to another aspect of the present invention, there is provided a program for causing a computer provided in a display generation device for generating a display screen including one or two or more user-selectable playback control items to function as a download section for downloading content data from a content server storing the content data, a data amount acquisition section for acquiring a data amount already downloaded and a data amount not yet downloaded by the download section among the content data, a rate acquisition section for acquiring a transmission rate of data from the content server to the display generation device, and a display screen generation section for generating the display screen including the playback control item according to the data amount acquired by the data amount acquisition section and the transmission rate acquired by the rate acquisition section.

Such a program can make hardware resources, including a CPU, a ROM or a RAM, for example, of a computer execute the functions of the download section, the data amount acquisition section, the rate acquisition section and the display screen generation section as described above. That is, the computer using the program can be made to function as the download section, the data acquisition section, the rate acquisition section and the display screen generation section described above.

Furthermore, in order to solve the above-described problems, according to another aspect of the present invention, there is provided a content download system including a display generation device for generating a display screen including one or two or more user-selectable playback control items and a content server capable of communication with the display generation device. The content server has content data stored in a storage medium. Furthermore, the display generation device includes a download section for downloading the content data from the content server, a data amount acquisition section for acquiring a data amount already downloaded and a data amount not yet downloaded by the download section among the content data, a rate acquisition section for acquiring a transmission rate of data from the content server to the display generation device, and a display screen generation section for generating the display screen including the playback control item according to the data amount acquired by the data amount acquisition section and the transmission rate acquired by the rate acquisition section.

Effect of the Invention

As described above, according to the display generation device, the display generation method, the program, and the content download system according to the present invention, the playback control item included in the display screen can be flexibly changed.

BRIEF DESCRIPTION OF THE DRAWINGS

FIG. 6 is an explanatory diagram showing an example of metadata stored in a storage section of the content server.

FIG. 15 is a function block diagram showing a configuration of a receiver according to a modified example.

Figure 1:
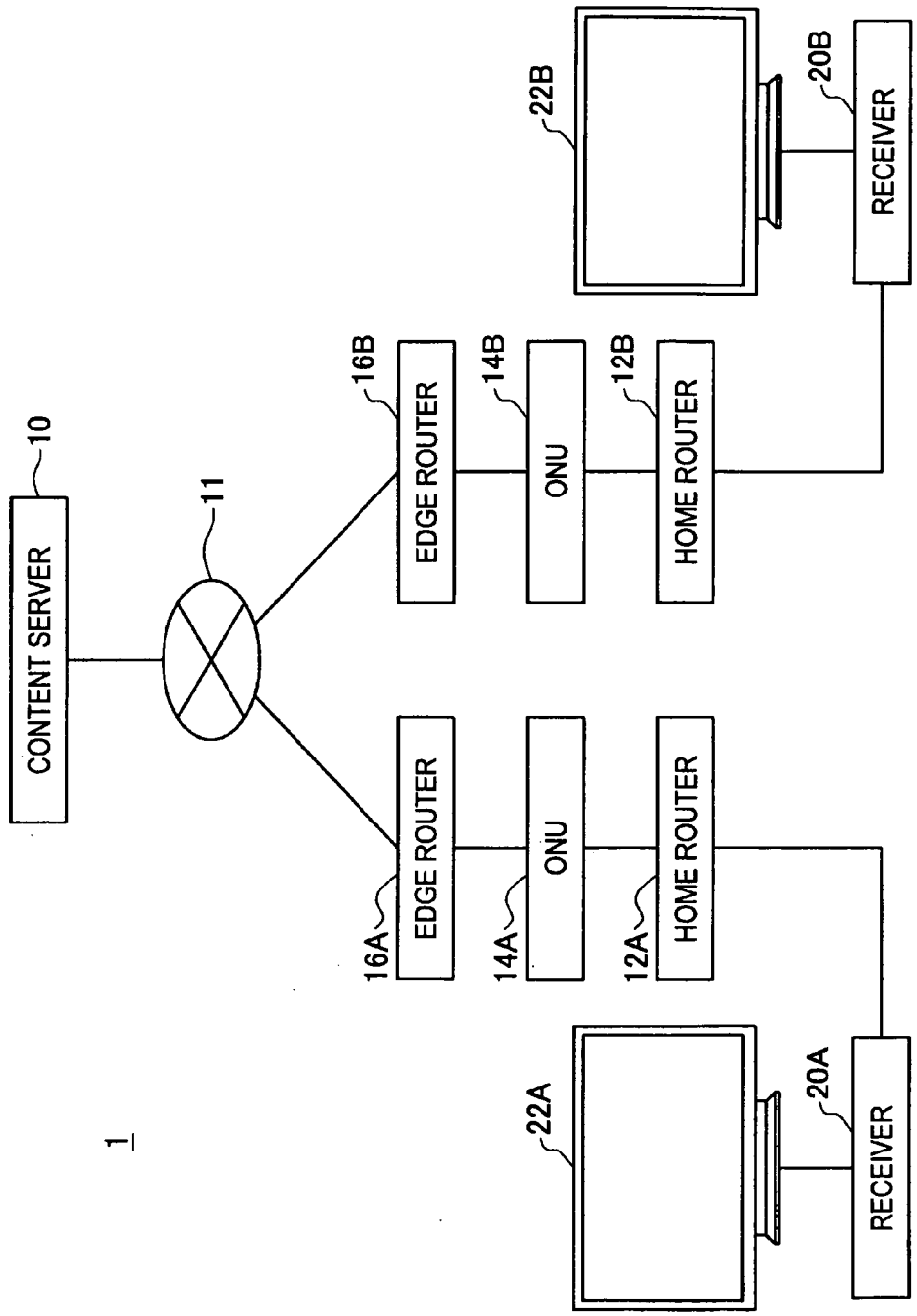
FIG. 1 is an explanatory diagram showing a configuration of a content download system according to an embodiment.

EXPLANATION OF REFERENCE NUMERALS 10 content server
20, 21 receivers
110, 252 storage sections
130 request processing section
220 operation detection section
224 content list acquisition section
228 display screen generation section
232 connecting section
236 transmission bandwidth measuring section
240 data amount acquisition section
244 determination section
248 download section
256 decoder
260 display section

BEST MODE FOR CARRYING OUT THE INVENTION

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Furthermore, the "best mode for carrying out the invention" will be described in the order shown below.

(1) Overview of content download system according to an embodiment
(2) Circumstances leading to the embodiment
(3) Detailed description of the embodiment
(3-1) Hardware configuration of receiver
(3-2) Functions of content server and receiver
(3-3) Modified example of receiver
(4) Conclusion (1) Overview of Content Download System According to an Embodiment First, referring to FIG. 1, a content download system 1 according to an embodiment will be schematically described.

FIG. 1 is an explanatory diagram showing a configuration of the content download system 1 according to the embodiment. As shown in FIG. 1, the content download system 1 includes a content server 10, multiple home routers 12A and 12B, multiple ONUs 14A and 14B, multiple edge routers 16A and 16B, multiple receivers 20A and 20B, and multiple display devices 22A and 22B. Additionally, in FIG. 1, components having the same functions are denoted with the same reference numeral and are distinguished from each other by adding a different alphabet letter to the reference numeral. However, when there is no particular need to distinguish each of the components having substantially the same function from the other, the description of the alphabet letter will be omitted. For example, when the receivers 20A and 20B need not be distinguished from each other, they will be simply referred to as the receiver 20.

The content server 10 stores a plurality of content data, and transmits the stored content data to the receiver 20 connected via a communication network 11. The content server 10 can perform unicast for transmitting the content data to only a specific receiver 20, multicast for transmitting the content data to a group including multiple receivers 20, and broadcast for transmitting the content data to unspecific receiver 20.

Furthermore, the content server 10 can transmit the content data by a streaming method or a download method. The streaming method is a method for the receiver 20 to playback the content data while receiving the content data, and according to the streaming method, the content data is not preserved in the receiver 20. On the other hand, the download method is a method for the receiver 20 to store the content data received from the content server 10 in a built-in storage medium, and playback the content data stored in the recording medium or the content data received from the content server 10.

Additionally, the concept of the content data includes audio data such as music, a lecture, a radio program, and the like, video data such as a motion picture, a television program, a video program, a photograph, a document, a painting, a chart, and the like, and miscellaneous data such as a game, software, and the like.

Furthermore, the communication network 11 is a wired or wireless transmission path for information transmitted from a device connected to the communication network 12. For example, the communication network 11 may include public network such as the Internet, telephone network, satellite network, or the like, and leased line network such as various local area networks including the Ethernet (registered trademark), wide area network (WAN), Internet protocol-virtual private network (IP-VPN), contents delivery network (CDN), or the like.

The receiver 20, which is an example of a display generation device, receives the operation selection of content by a user, and requests the acquisition of the content data of the content selected by the user to the edge router 16 via the home router 12 and the optical network unit (ONU).

The edge router 16 requests the content server 10 via the communication network 11 for the content data requested by the receiver 20, and transmits the content data transmitted from the content server 10 to the receiver 20 in response to the request via the ONU 14 and the home router 12.

When the content data is transmitted from the content server 10 by the download method, the receiver 20 can store the content data in the built-in storage medium, and can playback the stored content data. Here, the playback includes a process of generating, from the content data, information for output, such as a video signal, an audio signal or a caption signal. The content data played back by the receiver 20 in this manner can be displayed on the display device 22.

Additionally, the receiver 20 may be an information processing apparatus, such as a personal computer (PC), a mobile phone, a Personal Handyphone System (PHS), a portable music playback device, a portable video processing apparatus, personal digital assistants (PDA), or an electrical household appliance.

Furthermore, although only one content server 10 is shown in FIG. 1, in reality, tens or thousands of content servers 10 are assumed to be connected to the communication network 11. Similarly, although only two receivers 20A and 20A are shown in FIG. 1, in reality, tens of thousands, millions or hundreds of millions of receivers 20 are assumed to be connected to the communication network 11.

(2) Circumstances Leading to the Embodiment

Heretofore, the content download system 1 according to the embodiment has been schematically described with reference to FIG. 1. Subsequently, circumstances which led to the embodiment will be described with reference to FIGS. 2 and 3.

At the time of playing back content data, a receiver related to the embodiment acquires a content list from the content server 10. Here, the content list may be information indicating a list of content data the content server 10 is currently capable of transmitting. When the content list is acquired, the receiver related to the embodiment generates a content list screen 40 shown in FIG. 2, for example, and has it displayed by a display device connected thereto.

Figure 2:
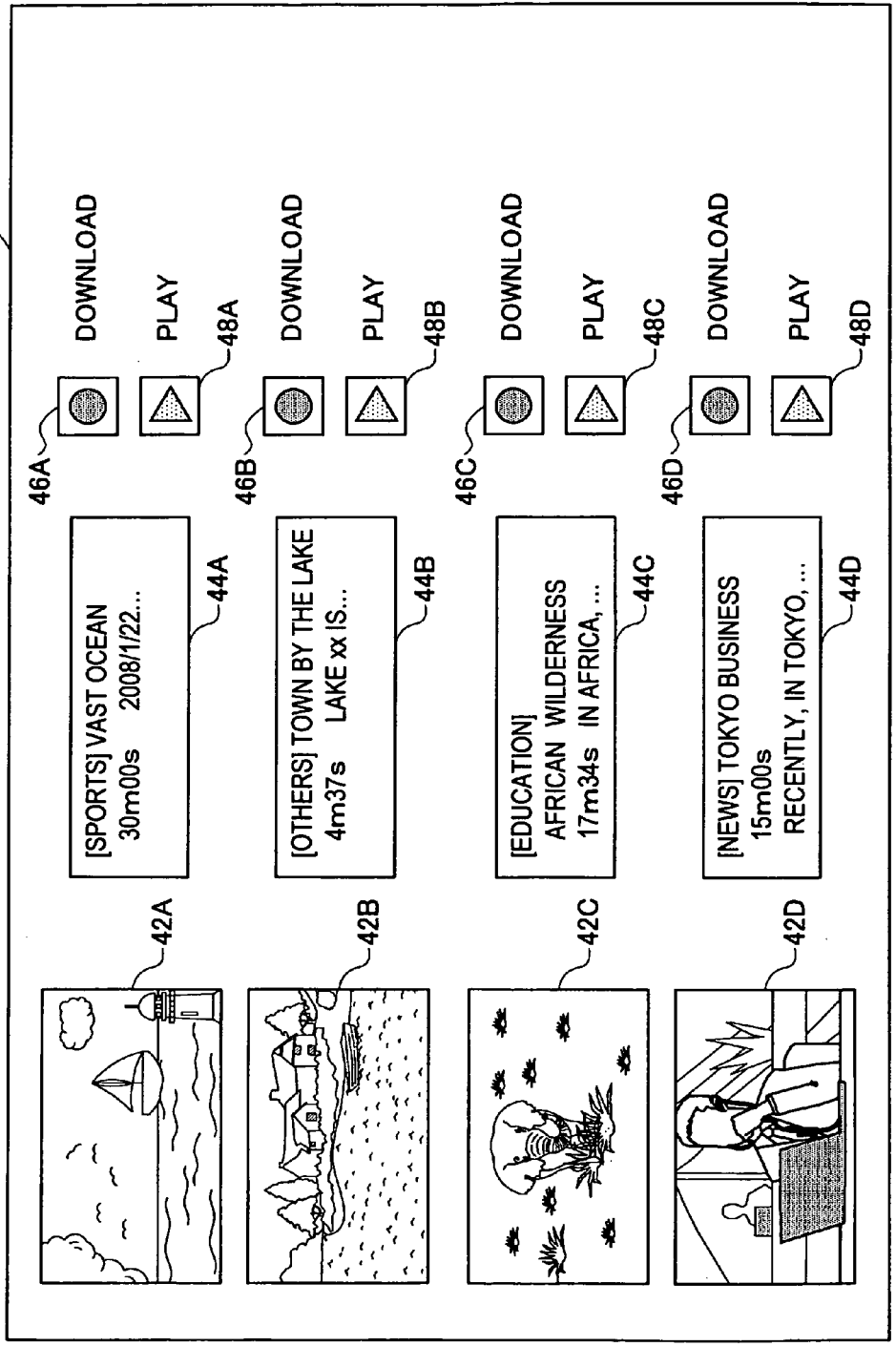
FIG. 2 is an explanatory diagram showing a content list screen generated by a receiver related to the embodiment.

FIG. 2 is an explanatory diagram showing the content list screen 40 generated by the receiver related to the embodiment. As shown in FIG. 2, the content list screen 40 includes thumbnails 42A to 42D corresponding to respective content data, summary information 44A to 44D, download buttons 46A to 46D, and play buttons 48A to 48D.

When, for example, the download button 46B for content data whose title is "Town by the Lake" is selected by a user on the content list screen 40 shown in FIG. 2, the receiver related to the embodiment starts the download of the content data of "Town by the Lake."

Furthermore, when, for example, the play button 48B for the content data whose title is "Town by the Lake" is selected by the user on the content list screen 40, the start of playback of the content data "Town by the Lake" is expected. However, when the transmission rate of content data from the content server 10 to the receiver related to the embodiment is slower than the playback rate of the content data, the receiver related to the embodiment cannot start the playback until a certain amount of the content data is downloaded. Even if the playback is started, the playback position of the content data catches up with the download position, and the playback is interrupted. Accordingly, with the receiver related to the embodiment, even if the play button 48 is selected by the user, a display as shown in FIG. 3, for example, is superimposed on the content list screen 40.

Figure 3:
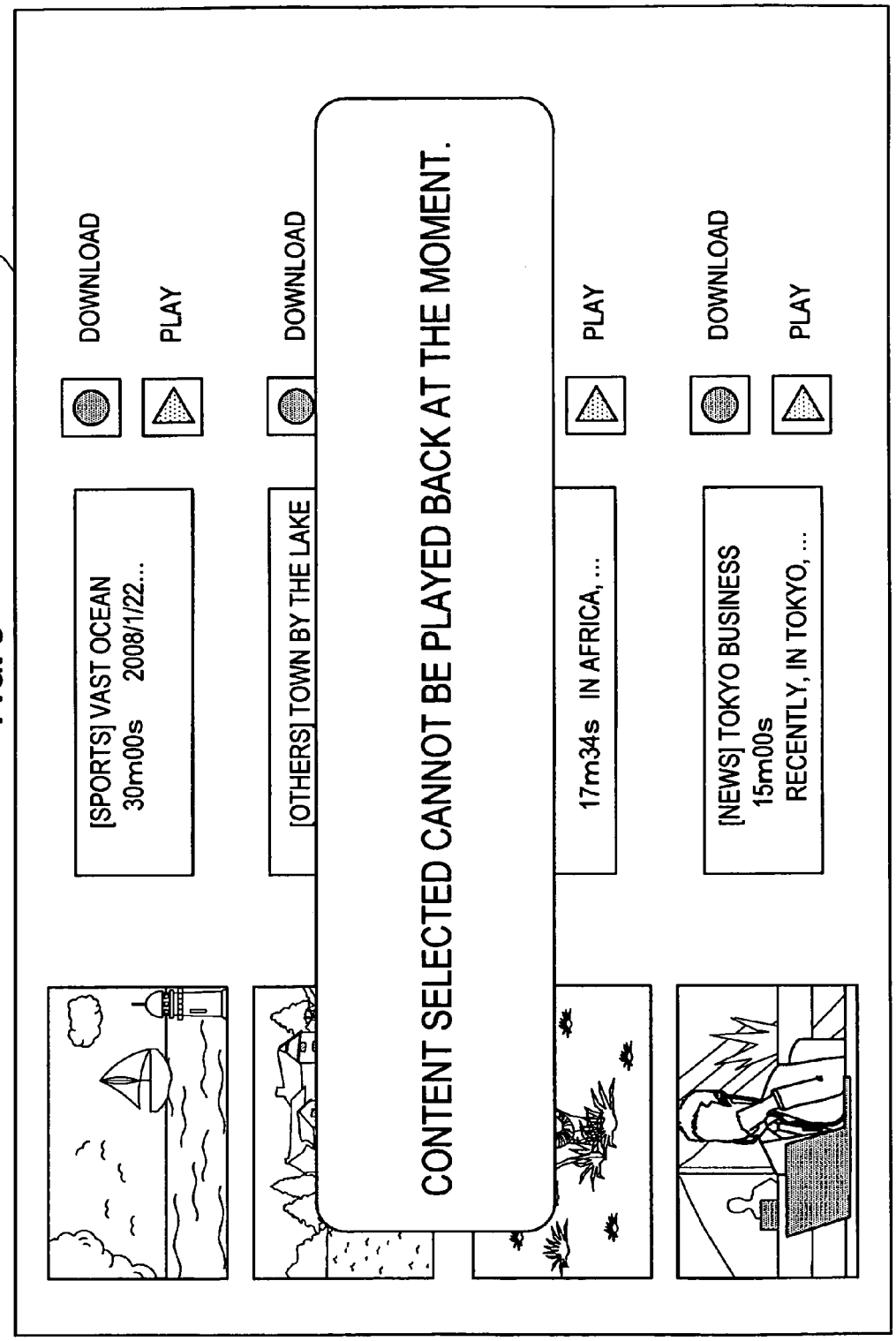
FIG. 3 is an explanatory diagram showing an example of a display to be superimposed on the content list screen.

FIG. 3 is an explanatory diagram showing an example of the display to be superimposed on the content list screen 40. As shown in FIG. 3, when the play button 48 is selected by the user while the playback of content data is not possible, the receiver related to the embodiment superimposes a display including the text "Content selected cannot be played back at the moment." on the content list screen 40. Or, the receiver related to the embodiment possibly shows no reaction even if the play button 48 is selected by the user while the playback of content data is not possible.

In this manner, with the receiver related to the embodiment, there were cases where the playback of content data is not started even when the user desired to playback the content data and selected the play button 48. Furthermore, since the user cannot grasp when the playback of the content data became possible, the user needed to repeatedly select the play button 48 until the playback is actually started.

Thus, focusing on the above-described situation, the receiver 20 according to the embodiment has been achieved. According to the receiver 20 according to the embodiment, when a playback control item is selected by a user, the playback control corresponding to the playback control item can be performed more steadily. Hereunder, the download system 1 including such a receiver 20 and a reception device 20 will be described in detail.

Figure 4:
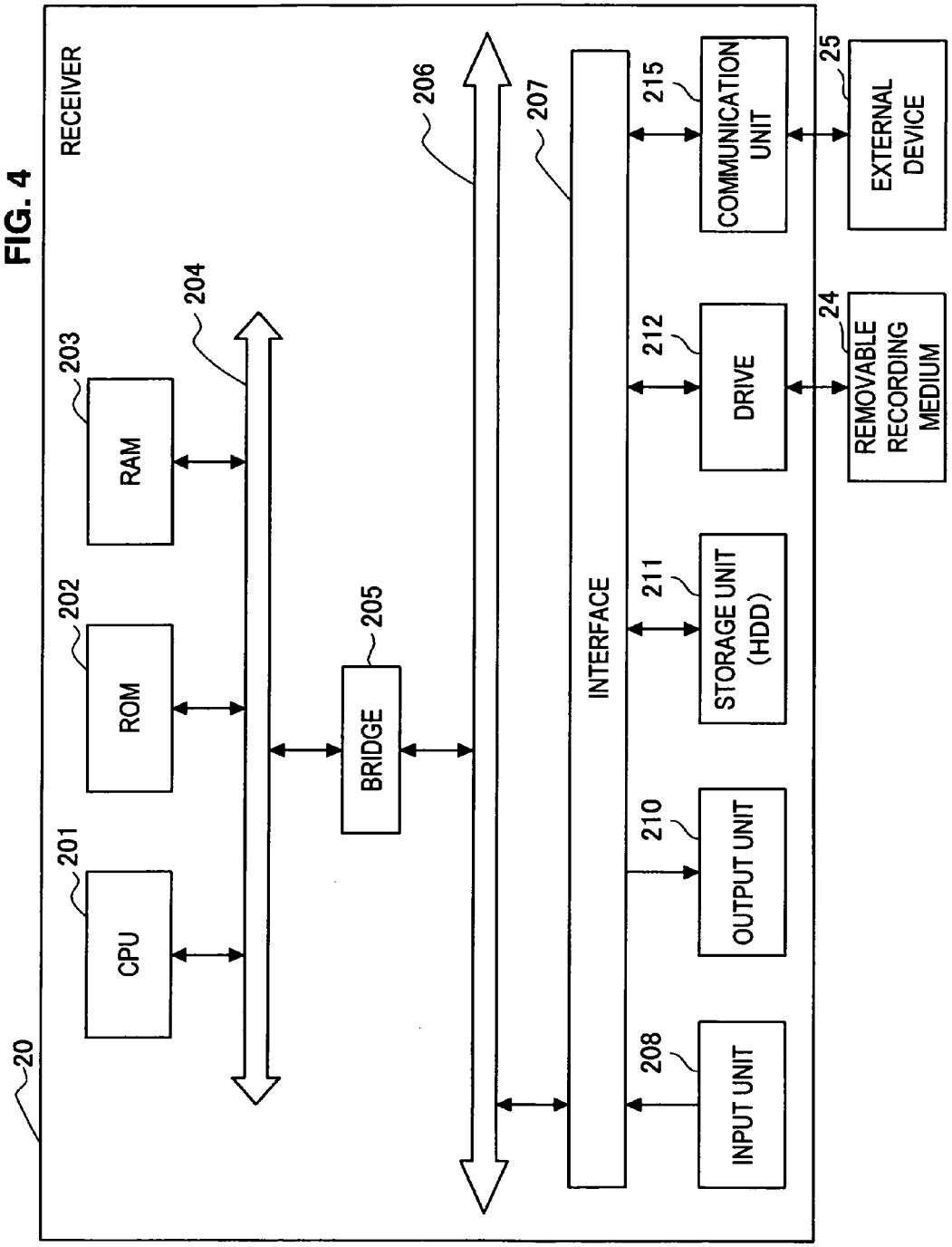
FIG. 4 is a block diagram showing a hardware configuration of a receiver.

(3) Detailed Description of the Embodiment (3-1) Hardware Configuration of Receiver FIG. 4 is a block diagram showing a hardware configuration of the receiver 20. The receiver 20 includes a central processing unit (CPU) 201, a read only memory (ROM) 202, a random access memory (RAM) 203, a host bus 204, a bridge 205, an external bus 206, an interface 207, an input unit 208, an output unit 210, a storage unit (HDD) 211, a drive 212, and a communication unit 215.

The CPU 201 functions as a processing unit and a control unit, and controls the overall operation in the receiver 20 according to various programs. Furthermore, the CPU 201 may be a microprocessor. The ROM 202 stores a program, a processing parameter, and the like to be used by the CPU 201. The RAM 203 temporarily stores a program to be used in the execution by the CPU 201, a parameter that changes as appropriate in the execution, and the like. These are mutually connected by the host bus 204 configured from a CPU bus or the like.

The host bus 204 is connected to the external bus 206, such as a peripheral component interconnect/interface (PCI) bus, via the bridge 205. Additionally, the host bus 204, the bridge 205 and the external bus 206 need not necessarily be configured separately from each other, and the functions may be implemented in a single bus.

The input unit 208 is configured from input means for a user to input information, such as a mouse, a keyboard, a touch panel, a button, a microphone, a switch or a lever, an input control circuit for generating an input signal based on the input by the user and outputting the input signal to the CPU 201, and the like, for example. The user of the receiver 20 can, by operating the input unit 208, input various data to the receiver 20 or instruct a processing operation.

The output unit 210 is configured from a display device such as a cathode ray tube (CRT) display device, a liquid crystal display (LCD) device, an organic light emitting display (OLED) device or a lamp, and an audio output device, such as a speaker or a headphone, for example. The output unit 210 outputs played back content, for example. Specifically, the display device displays various information, such as played back video data, in text or image. On the other hand, the audio output device converts played back audio data or the like into sound and outputs the sound. Additionally, such an output unit 210 is not an indispensable structural element of the receiver 20 according to the embodiment, and the receiver 20 does not have to include the output unit 210.

The storage unit 211 is a device for data storage configured as an example of a storage section of the receiver 20 according to the embodiment. The storage unit 211 may include a storage medium, a recording device for recording data in the storage medium, a reading device for reading out data from the storage medium, a deleting device for deleting data stored in the storage medium, or the like. The storage unit 211 is configured from a hard disk drive (HDD), for example. The storage unit 211 drives a hard disk, and stores a program to be executed by the CPU 201 and various data. Furthermore, content data is stored in the storage unit 211, for example.

The drive 212 is a reader/writer for a storage medium, and is built in or externally attached to the receiver 20. The drive 212 reads out information stored in a removable storage medium 24, such as a magnetic disk, an optical disk, a magneto-optical disk, a semiconductor memory, or the like, and outputs the information to the RAM 203.

The communication unit 215 is a communication interface configured from a communication device or the like for connecting to the communication network 11, for example. Furthermore, the communication unit 215 may be a wireless local area network (LAN) compatible communication device, a wireless USB compatible communication device, or a wired communication device for performing wired communication. The communication unit 215 transmits/receives various data, such as content data, metadata or the like, to/from the content server 10 via the communication network 11. Furthermore, the communication unit 215 may be connected with the display device 22, and may output video and audio to the display device 22.

Heretofore, the hardware configuration of the receiver 20 has been described with reference to FIG. 4. Although the content server 10 and the display device 22 configuring the content download system 1 also include hardware, the hardware of the content server 10 and the display device 22 may be substantially the same with the hardware configuration of the receiver 20, and the explanation thereof will be omitted.

(3-2) Functions of Content Server and Receiver

Subsequently, with reference to FIGS. 5 to 13, functions of the content server 10 and the receiver 20 according to the embodiment will be described.

Figure 5:
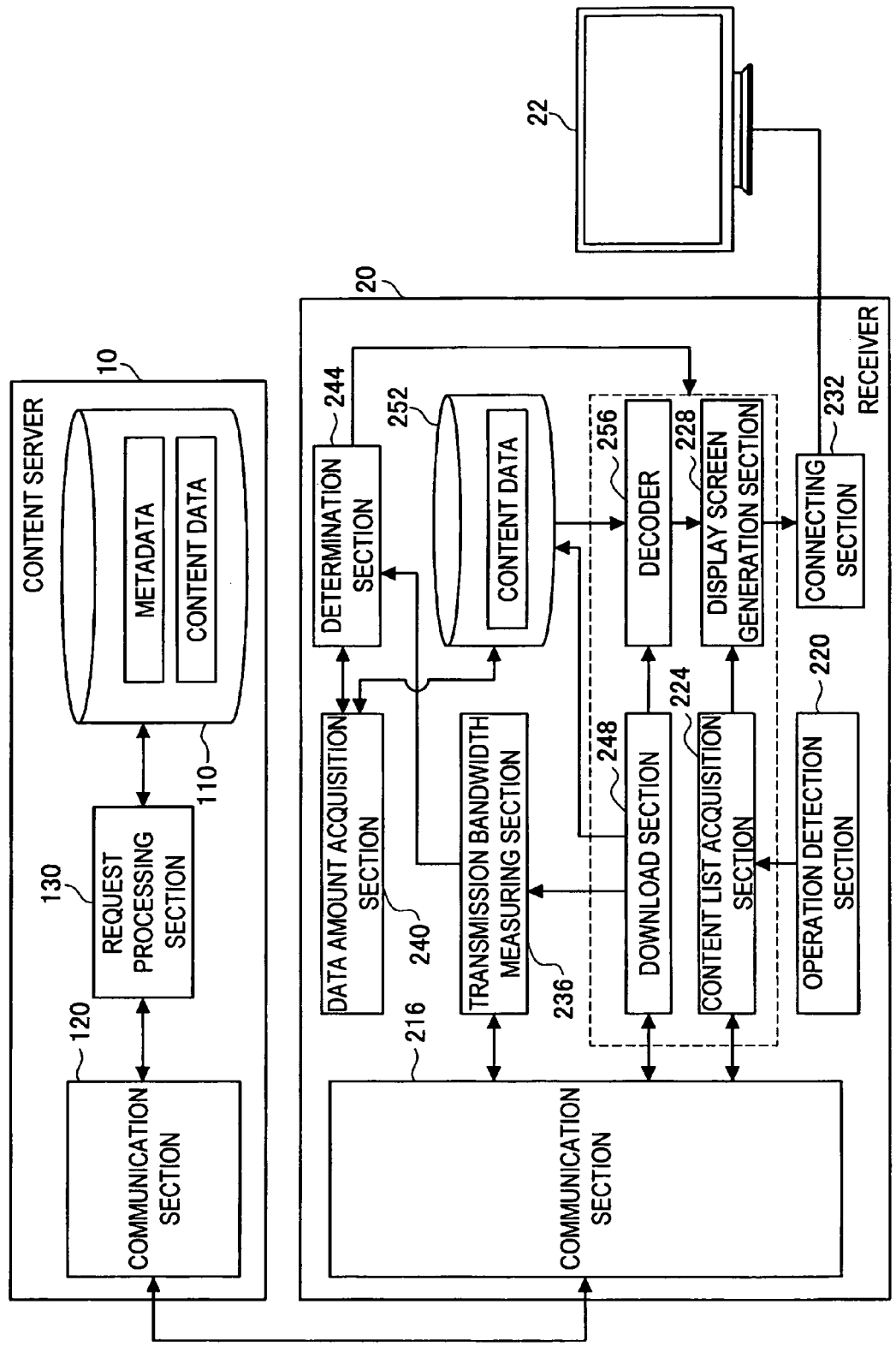
FIG. 5 is a function block diagram showing a configuration of a content server and a receiver according to the embodiment.

FIG. 5 is a function block diagram showing a configuration of the content server 10 and the receiver 20 according to the embodiment. As shown in FIG. 5, the content server 10 includes a storage section 110, a communication section 120, and a request processing section 130. Furthermore, the receiver 20 includes a communication section 216, an operation detection section 220, a content list acquisition section 224, a display screen generation section 228, a connecting section 232, a transmission bandwidth measuring section 236, a data amount acquisition section 240, a determination section 244, a storage section 252, and a decoder 256.

A plurality of content data and metadata of the respective content data are stored in the storage section 110 of the content server 10. As described in "(1) Overview of content download system according to an embodiment," the content data is a concept that includes audio data such as music, a lecture, a radio program, and the like, video data such as a motion picture, a television program, a video program, a photograph, a document, a painting, a chart, and the like, and miscellaneous data such as a game, software, and the like. The metadata is data indicating the attribute of the respective content data described above as shown in FIG. 6, for example.

FIG. 6 is an explanatory diagram showing an example of the metadata stored in the storage section 110 of the content server 10. As shown in FIG. 6, the metadata includes a content ID, a title, a genre, playing time, a commentary, a thumbnail and data size of the corresponding content data.

Specifically, in the uppermost part in FIG. 6, metadata corresponding to content data whose content ID is "5347," whose title is "Vast Ocean," whose genre is "Sports," whose playing time is "30 m00 s," commentary on which is "2008/1/22...," whose thumbnail includes an image of a yacht, and whose data size is 2.2 GB, is shown. Similarly, metadata corresponding to content data whose title is "Town by the Lake," metadata corresponding to content data whose title is "African Wilderness," and metadata corresponding to content data whose title is "Tokyo Business" are shown in FIG. 6. Additionally, location information indicating the location in which the thumbnail is stored may also be described as the thumbnail.

Additionally, the storage section 110 may be a storage medium such as a non-volatile memory such as an electrically erasable programmable read-only memory (EEPROM) and an erasable programmable read only memory (EPROM), a magnetic disk such as a hard disk and a discoid magnetic disk, an optical disk such as a compact disc recordable (CD-R), a compact disc rewritable (CD-RW), a digital versatile disc recordable (DVD-R), a digital versatile disc rewritable (DVD-RW), a dual-layer digital versatile disc recordable (DVD+R), a dual-layer digital versatile disc rewritable (DVD+RW), a digital versatile disc random access memory (DVD-RAM), a Blu-ray (registered trademark) disc recordable (BD-R) and a Blu-ray (registered trademark) disc rewritable (BD-RE), or a magneto-optical (MO) disk.

Here, the configuration of the content server 10 will be again described with reference to FIG. 5. The communication section 120 of the content server 10 shown in FIG. 5 is an interface to the receiver 20, and accepts various requests from the receiver 20 or transmits various data to the receiver 20. As various requests, there are a download request for content data, an acquisition request for metadata, and the like, for example. Furthermore, as various data, there are content data, metadata (content list), and the like.

Furthermore, the request processing section 130 of the content server 10 performs a process of responding to a request received from the receiver 20 via the communication section 120. For example, when a content list is requested by the receiver 20, the request processing section 130 reads out metadata corresponding to content data which can currently be transmitted among the content data stored in the storage section 110, and transmits the metadata to the receiver 20.

Furthermore, when download of specific content data is requested by the receiver 20, the request processing section 130 reads out the specific content data from the storage section 110, and transmits the specific content data to the receiver 20 by the download method. Moreover, when streaming of specific content data is requested by the receiver 20, the request processing section 130 may read out the specific content data from the storage section 110, and transmit the specific content data to the receiver 20 by the streaming method.

The communication section 216 of the receiver 20 is an interface to the content server 10, and transmits various requests to the content server 10 or receives various data from the content server 10. As described above, as various requests, there are a download request for content data, an acquisition request for metadata, and the like, for example, and as various data, there are content data, metadata (content list), and the like.

The operation detection section 220 is an interface to a user of the receiver 20, and detects various operations by the user. The user of the receiver 20 can input various data to the receiver 20 or instruct various playback controls by operating the operation detection section 220. As the details of the operation by the user on the operation detection section 220, there are selection of content data from the content list, play/pause/fast-forward/rewind/volume control of the control data, and the like, for example.

When a content list acquisition request from the user is detected by the operation detection section 220, the content list acquisition section 224 requests the content server 10 via the communication section 216 for the content list. When requested for the content list by the content list acquisition section 224, the request processing section 130 of the content server 10 reads out metadata stored in the storage section 110 and transmits the metadata as the content list to the receiver 20. Thus, the content list acquisition section 224 can acquire the content list from the content server 10 based on a user operation.

Additionally, the content list is a list including content data that the content server 10 is currently capable of transmitting. Accordingly, the content list may be a list including all of the content data that the content server 10 is currently capable of transmitting, or may be a list including a part of the content data that the content server 10 is currently capable of transmitting.

For example, when a content list of content data belonging to a specific genre is requested by the user, the content list acquisition section 224 may request the content server 10 for the content list of the content data belonging to the specific genre, and the request processing section 130 may read out the metadata of the content data belonging to the specific genre among the metadata stored in the storage section 110 and transmit the metadata as the content list of the content data belonging to the specific genre to the receiver 20.

Similarly, in response to a request from the user, the content list acquisition section 224 may acquire any content list, such as a content list of content data whose playing time is within a specific time, a content list of content data whose data size is within a specific range, a content list of content data whose release data is within a specific range, and the like.

Figure 7:
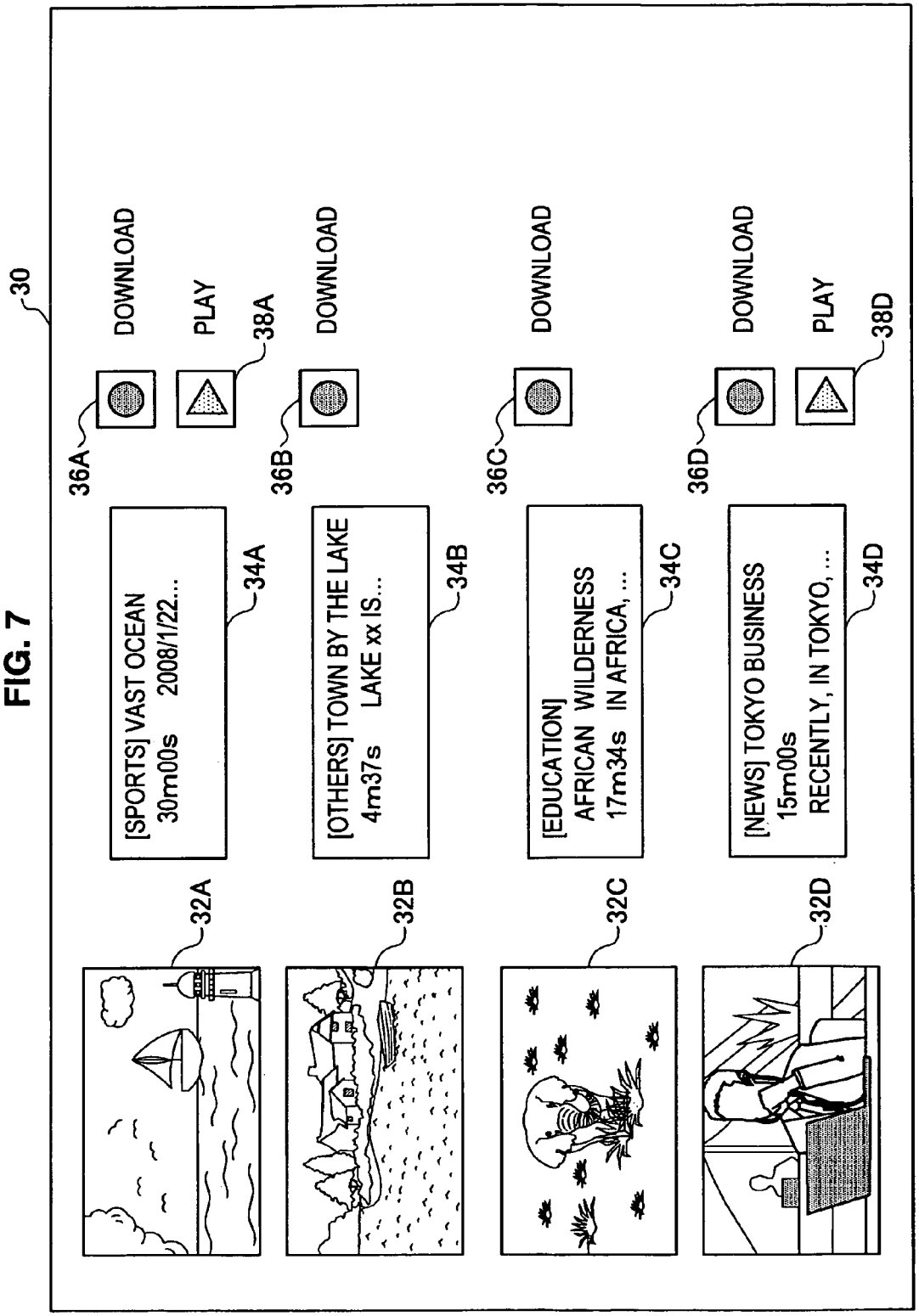
FIG. 7 is an explanatory diagram showing an example of a content list screen generated by a display screen generation section.

The display screen generation section 228 generates a display screen to be displayed on the display device 22 connected to the connecting section 232 of the receiver 20. For example, the display screen generation section 228 generates various display screens, such as a content list request screen for the user to perform an acquisition request for a content list, a content list screen (menu screen) showing a content list acquired by the content list acquisition section 224, a playlist screen showing a list of content data currently capable of being played back, a playback screen of content data, and the like. With reference to FIG. 7, an example of the content list screen generated by the display screen generation section 228 will be described.

FIG. 7 is an explanatory diagram showing an example of a content list screen 30 generated by the display screen generation section 228. The content list screen 30 generated based on a content list is shown in FIG. 7 where the metadata of the content data "Vast Ocean", "Town by the Lake", "African Wilderness" and "Tokyo Business" shown in FIG. 6 are acquired by the content list acquisition section 224 as the content list.

As shown in FIG. 7, the content list screen 30 includes thumbnails 32A to 32D, summary information 34A to 34D and download buttons 36A to 36D corresponding to respective content data. Furthermore, the content list screen 30 shown in FIG. 7 includes a play button 38A for the content data "Vast Ocean," and a play button 38D for the content data "Tokyo Business."

When one of the download buttons 36A to 36D or the play buttons 38A, 38D included in the content list screen 30 is selected by the user, the receiver 20 performs a playback control corresponding to the selected button. For example, when a selection operation by the user for the download button 36B is detected by the operation detection section 220, a download section 248 starts download of the content data "Town by the Lake" corresponding to the download button 36B.

Furthermore, when a selection operation by the user for the play button 38A is detected by the operation detection section 220, the download section 248 starts download of the content data "Vast Ocean" corresponding to the to the play button 38A, and the decoder 256 starts playback based on the data downloaded by the download section 248. The download buttons 36A to 36D, the play buttons 38A and 38D, and the like, have a function as the playback control item.

Furthermore, the display screen generation section 228 superimposes a playback control item according to a determination result by the determination section 244 on the content list screen 330. The reason that the content list screen 30 shown in FIG. 7 does not include play buttons for the content data "Town by the Lake" and "African Wilderness" is that the determination section 244 determined that playback of the content data "Town by the Lake" and "African Wilderness" cannot be started. Here, "playback cannot be started" means that proper playback is not performed, for example, playback cannot be started altogether or even if the playback is started, playback is interrupted midway. In the following, explanation will be made on the determination section 244 making such a determination, along with the transmission bandwidth measuring section 236 and the data amount acquisition section 240 for providing the determination section 244 with information for making determination.

The transmission bandwidth measuring section 236 has a function of a rate acquisition section for acquiring the bandwidth of a transmission path between the content server 10 and the receiver 20, that is, the transmission rate of data. The method for acquiring the transmission rate may be any method, and a method described below may be used, for example.

(1) Holding of Immediately Preceding Transmission Rate

The transmission bandwidth measuring section 236 may measure the transmission rate of content data while the content data is being downloaded by the download section 248, and hold the average value of the transmission rate down to the completion of download of the content data. Then, when the content list screen 30 is generated by the display screen generation section 228 at a later time, the transmission rate being held may be supplied to the determination section 244.

(2) Trial Transmission

The transmission bandwidth measuring section 236 may request the content server 10 for transmission of any data on a trial basis, and measure the transmission rate of the data transmitted from the content server 10 in response to the request. Here, the transmission bandwidth measuring section 236 may acquire the transmission rate between the content server 10 and the receiver 20 by measuring the transmission rate of the content list transmitted from the content server 10.

(3) Monitoring of Transmission State in Surroundings

For example, the transmission bandwidth measuring section 236 of the receiver 20A shown in FIG. 1 may measure the transmission rate of content data to be transmitted to another receiver 20B. Specifically, the transmission bandwidth measuring section 236 can also request the edge router 16A for transfer of content data not addressed to the receiver 20A, actually receive the content data not addressed to the receiver 20A, and measure the transmission rate at the time of receiving the content data. Additionally, the transmission bandwidth measuring section 236 does not have to hold the content data not addressed to the receiver 20A.

The transmission bandwidth measuring section 236 supplies to the determination section 244 the transmission rate of content data acquired by the above-described methods, for example.

The data amount acquisition section 240 acquires, for each content data, a data amount not yet downloaded. For example, the data amount acquisition section 240 calculates the data amount not yet downloaded by subtracting a data amount already downloaded from the data amount of the entire content data.

The data amount of the entire content data can be specified by the data size included in the content list acquired by the content list acquisition section 224. Furthermore, the data amount already downloaded can be specified by referring to the data amount of content data stored in the storage section 252. The data amount acquisition section 240 supplies to the determination section 244 the data amount not yet downloaded acquired by the above-described method shown as an example.

The determination section 244 determines the playback control item to be displayed by the display screen generation section 228 based on the data amount not yet downloaded supplied from the data amount acquisition section 240 and the transmission rate of content data supplied from the transmission bandwidth measuring section 236. In the following, explanation will be made where the determination section 244 makes the display screen generation section 228 display a play button and a fast-forward button as the playback control items.

A. Display of Play Button

The determination section 244 determines whether or not playback can be completed without a data playback position catching up with a data download position when playback of certain content data is started at the present. For example, the determination section 244 determines the relationship between remaining download time and the playing time of the content data, and when the remaining download time falls below the playing time of the content data, the determination section 244 makes the display screen generation section 228 display a play button on the content list screen. Here, the remaining download time may be a time assumed to be required until the download of content data is completed, and the playing time of content data may be a time assumed to be required until the playback of the entire content data is completed when playing back the content data at a normal rate.

Here, the determination section 244 may calculate the remaining download time by dividing the data amount not yet downloaded supplied from the data amount acquisition section 240 by the transmission rate of content data supplied from the transmission bandwidth measuring section 236. Furthermore, the determination section 244 may specify the playing time of content data by the playing time included in the content list acquired by the content list acquisition section 224.

By such a function of the determination section 244, the display screen generation section 228 superimposes the play button for the corresponding content data when the remaining download time falls below the playing time of the content data. When the play button is displayed on the content list screen 30, the user can select the play button and make the receiver 20 start playback of the corresponding content data.

Here, since the play button is displayed after the remaining download time falls below the playing time of the content data, it is assumed that the data playback position will not catch up with the data download position even if the playback of the content data is started based on a user operation. Accordingly, the receiver 20 can playback the content data to the end without any interruption. Specifically, when a play button is selected by the user, since the playback process desired by the user is properly performed, the convenience of the user can be enhanced.

Additionally, heretofore, a determination method of the determination section 244 using the remaining download time and the playing time has been described. The determination section 244 may also determine whether or not the playback can be completed without the data playback position catching up with the data download position by using the data amount of the entire content data, the transmission rate and the data density.

To describe in more detail, the determination section 244 may compute the equation: (data amount of entire content data)·((data density−transmission rate)/data density). Then, when the data amount already downloaded exceeds the data amount obtained as a result of computation of the equation, a determination can be made that the playback can be completed without the data playback position catching up with the data download position.

Here, the data density means the data amount used per unit time when content data is played back at a normal rate. The determination section 244 can calculate the data density by dividing the data size included in the content list by the playing time.

Also with the method described above using the data amount of the entire content data, the transmission rate and the data density, the determination section 244 can appropriately determine whether or not a proper playback is possible, and can instruct the display screen generation section 228 of display of the play button.

B. Display of Fast-Forward Button

Furthermore, when shifting from fast-forwarding, over a predetermined time or more, of content data to playback at a normal rate, the determination section 244 determines whether or not the playback will be completed without the data playback position catching up with the data download position. For example, the determination section 244 determines the relationship between remaining playing time and the remaining download time, and when the remaining playing time is longer than the remaining download time by a predetermined time or more, the determination section 244 makes the display screen generation section 228 display the fast-forward button. Here, the remaining playing time may be a time assumed to be required until the playback of the entire content data is completed when the content data is played back at a normal rate. Accordingly, the playing time and the remaining playing time of content data match each other when playback of the content data is not started.

Here, the determination section 244 may calculate the remaining playing time by subtracting the already played back time of the content data from the playing time of the entire content data. Or, the remaining playing time may be calculated by multiplying the playing time of the entire content data by the value obtained by dividing the data amount not yet downloaded among the content data by the data amount of the entire content data.

By such a function of the determination section 244, when fast-forwarding is selected by the user, the receiver 20 can continue fast-forwarding as long as it can be guaranteed that proper playback at a normal rate will be performed to the end.

Additionally, the predetermined time described above may be a fixed time set in advance. However, if the predetermined time is a fixed time, a fast-forward button for the content data whose playing time is shorter than the fixed time will not be displayed. Accordingly, the above-described predetermined time may be a time flexibly set so as to be longer as the playing time of the content data is longer and shorter as the playing time of the content data is shorter.

Furthermore, when the predetermined time is a fixed time and the remaining playing time of the content data is shorter than the fixed time, the fast-forward button is not displayed until the playback of the content data is completed. Accordingly, the above-described predetermined time may be a time flexibly set so as to be long if the remaining playing time of the content data is long and short if the remaining playing time of the content data is short.

When the download button for certain content data is selected by the user, and when the play button is selected, the download section 248 starts the download of the content data from the content server 10. Then, the download section 248 supplies the content data downloaded from the content server 10 to the storage section 252. Furthermore, the download section 248 may supply the content data downloaded from the content server 10 to the decoder 256.

Additionally, it is assumed that content data to be downloaded from the content server 10 has been subjected to image compression such as Joint Photographic coding Experts Group (JPEG), Moving Picture Experts Group (MPEG) 1, MPEG 2 or MPEG 4, or audio compression such as MPEG1 Audio Layer-3 (MP3), Advanced Audio Coding (AAC), Linear PCM (LPCM), Windows (registered trademark) Media Audio 9 (WMA9), Adaptive Transform Acoustic Coding (ATRAC) or ATRAC3.

The storage section 252 stores content data downloaded by the download section 248. As with the storage section 110 of the content server 10, the storage section 252 may be a non-volatile memory such as an EEPROM and an EPROM, a magnetic disk such as a hard disk and a discoid magnetic disk, an optical disk such as CD-R/RW, DVD-R/RW/+R/+RW/RAM and BD (Blu-ray (registered trademark))-R/BD-RE, or a magneto-optical (MO) disk.

The decoder 256 has a function of a playback section which, in a case a play button for certain content data is selected by the user, decodes data already downloaded among the content data stored in the storage section 252 and generates a playback screen. Furthermore, the decoder 256 may directly decode data downloaded by the download section 248 instead of the data stored in the storage section 252.

Furthermore, when a fast-forward button for certain content data is selected by the user, the decoder 256 performs fast-forward playback of data already downloaded among the content data. Here, when the content data is video data configured from multiple frames, the concrete process of the fast-forward playback may be to selectively decode a portion of frames among the multiple frames. Similarly, when a stop button for certain content data is selected by the user, the decoder 256 stops the decoding of the content data.

Heretofore, the configuration of the receiver 20 has been described. Subsequently, with reference to FIGS. 8 to 14, an operation example of the receiver 20 will be described.

Figure 8:
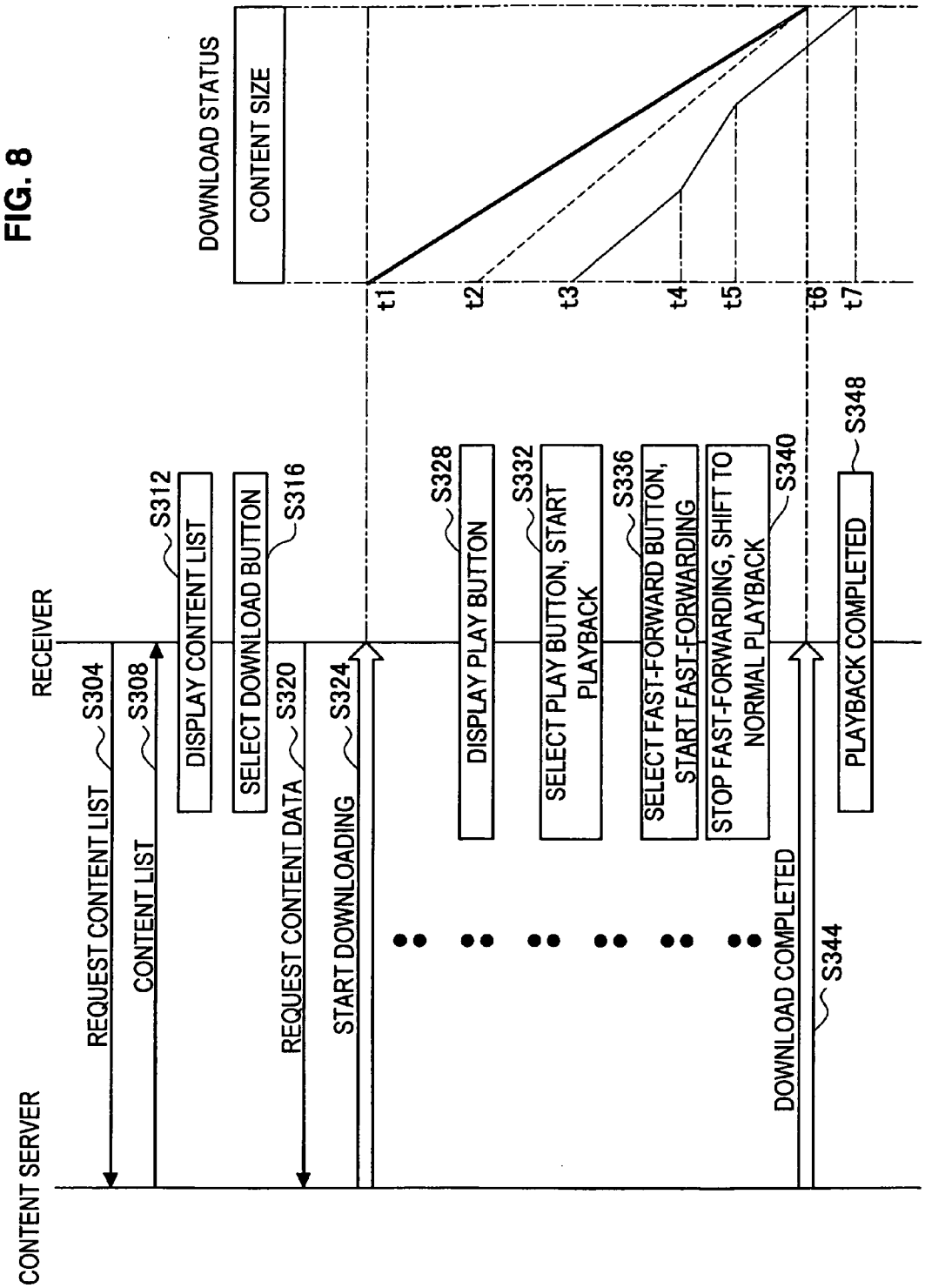
FIG. 8 is a sequence diagram showing a flow of processing to be executed in the content server and the receiver.

FIG. 8 is a sequence diagram showing a flow of processing to be executed in the content server 10 and the receiver 20. As shown in FIG. 8, first, the content list acquisition section 224 of the receiver 20 requests the content server 10 for transmission of a content list based on a user operation (S304). When requested by the receiver 20 for the content list, the content server 10 transmits metadata stored in the storage section 110 to the receiver 20 as the content list (S308).

Then, when the content list is acquired by the content list acquisition section 224, the display screen generation section 228 generates the content list screen 30 shown in FIG. 7, for example, and has it displayed by the display device 22 (S312). Subsequently, when the download button 36B for the content data "Town by the Lake" is selected by the user (S316), the download section 248 requests the content server 10 for transmission of the content data "Town by the Lake" (S320). In response to the request from the receiver 20, the content server 10 starts transmission of the content data "Town by the Lake" (S324).

Here, in FIG. 8, a schematic diagram showing a content data download status by the receiver 20 is shown in parallel with the sequence diagram. In the schematic diagram, the horizontal direction indicates data amount, and the vertical direction indicates time. Furthermore, data amount of content data already downloaded is indicated by a double line. Referring to the double line, at time t1, which is when the download is started, the data amount already downloaded is 0, and the data amount already downloaded increases as the time passes. Additionally, although the double line is shown to be linear in FIG. 8, in reality, increase rate of the data amount already downloaded is assumed to vary depending on the fluctuation in the transmission rate of the transmission path.

Figure 9:
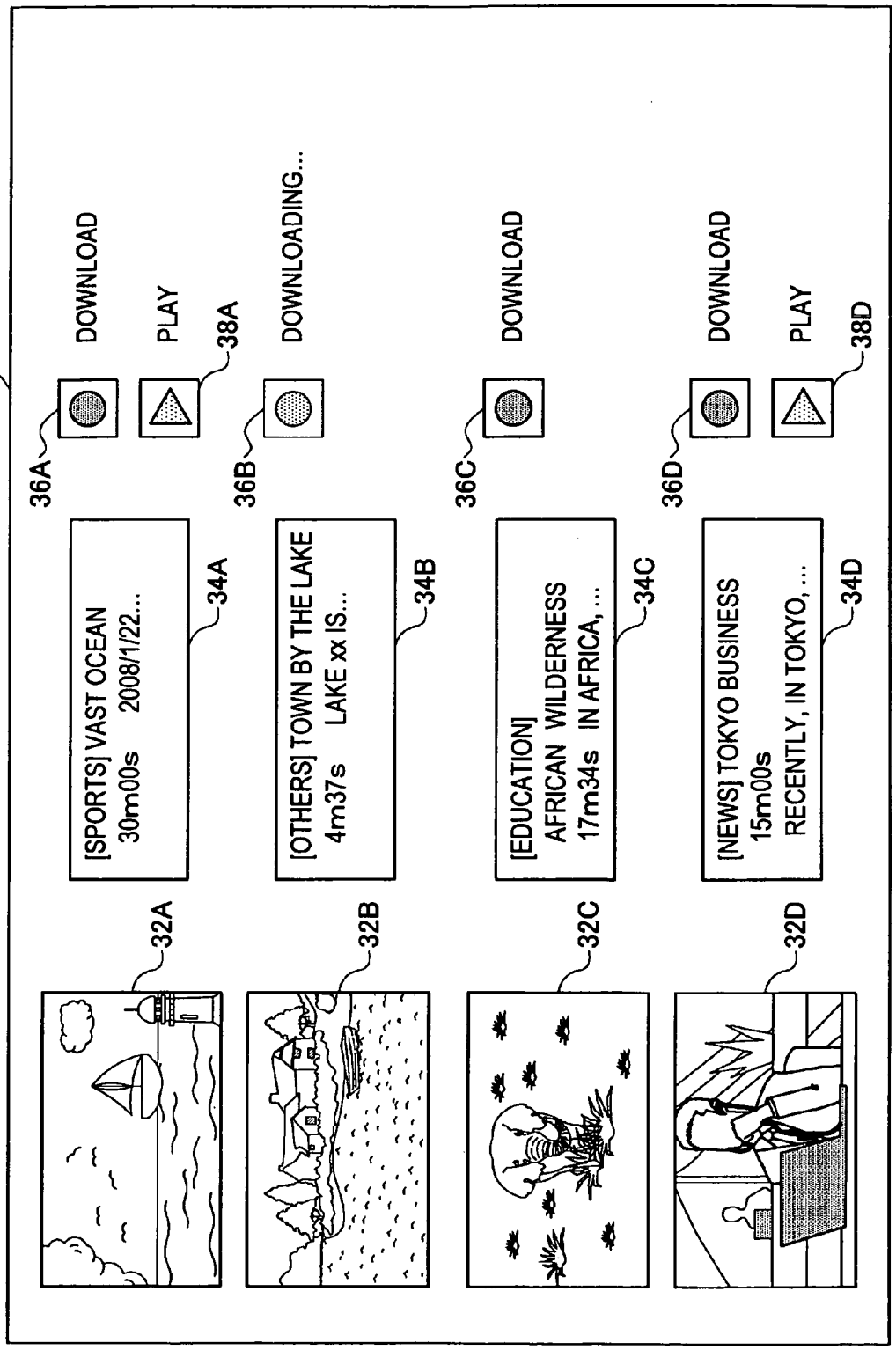
FIG. 9 is an explanatory diagram showing the content list screen generated after download is started.

Furthermore, when the download of the content data "Town by the Lake" is started in S324, the display screen generation section 228 generates the content list screen 30 shown in FIG. 9.

FIG. 9 is an explanatory diagram showing the content list screen 30 generated after the download is started. As shown in FIG. 9, when the download is started, the display screen generation section 228 differentiates the display of the download button 36B for the content data "Town by the Lake" from other download buttons, and also, changes the letters "Download" to "Downloading . . . ." However, at this stage, the play button for the content data "Town by the Lake" is not yet displayed.

Figure 10:
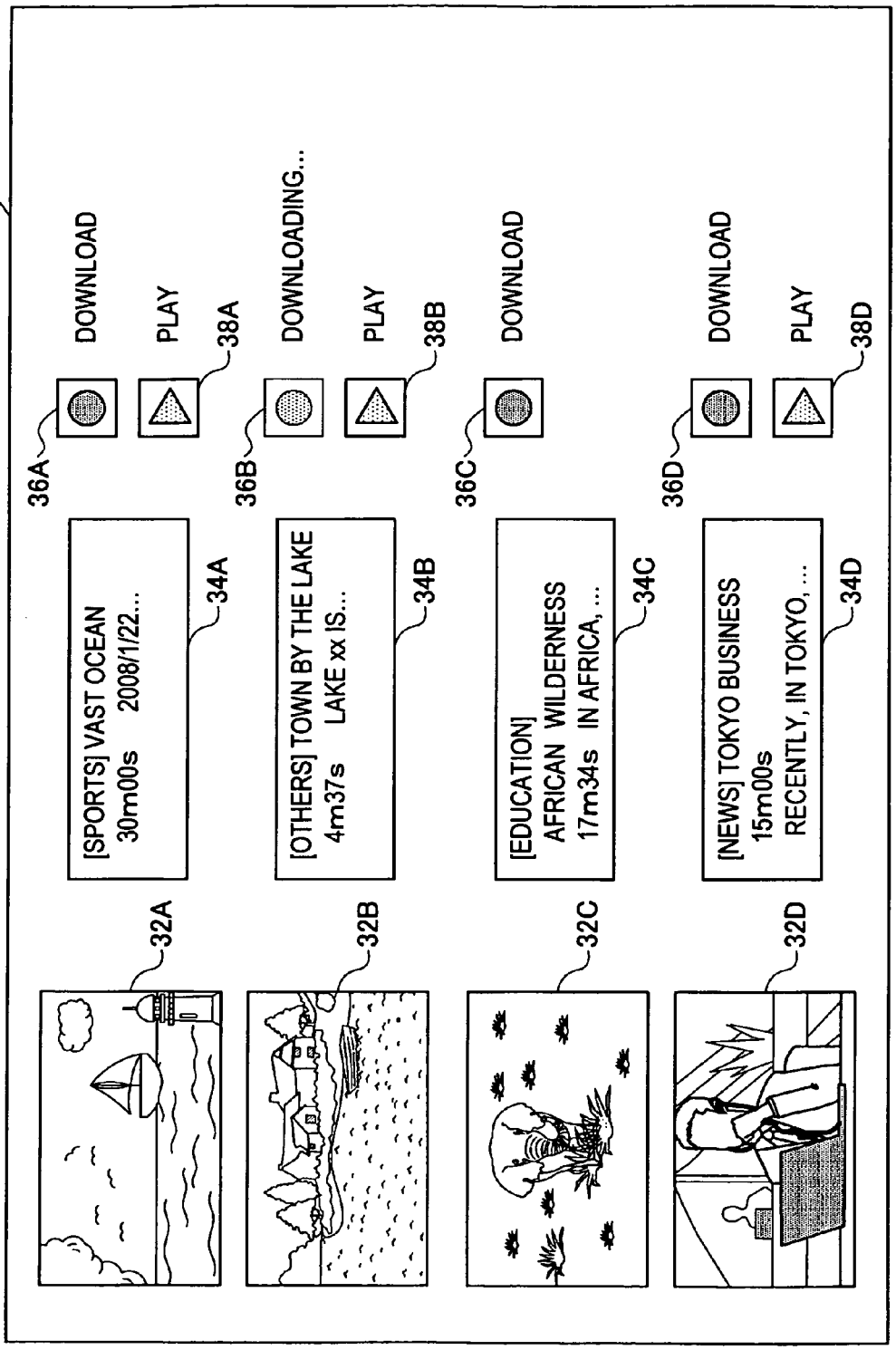
FIG. 10 is an explanatory diagram showing the content list screen including an added play button.

Then, when time t2, which is when the data playback position will no longer catch up with the data download position, is reached, the determination position 244 of the receiver 20 makes the display screen generation section 228 display a play button 38B for the content data "Town by the Lake" (S328) as shown in FIG. 10. Here, in the schematic diagram of FIG. 8, the dotted line indicates the data amount which will be already played back with the passing of time where the playback is assumed to have started at time t2. Referring to the schematic diagram, since the double line and the dotted line do not cross each other until time t6, which is the download completion time, it is supposed that the data playback position does not catch up with the data download position even if the playback is started at time t2 or later.

FIG. 10 is an explanatory diagram showing the content list screen 30 including the added play button. As shown in FIG. 10, when time t2, which is when the data playback position of the content data "Town by the Lake" will no longer catch up with data download position, is reached, the display screen generation section 228 generates the content list screen 30 including the play button 38B for the contend data "Town by the Lake" based on the instruction from the determination section 244.

Figure 11:
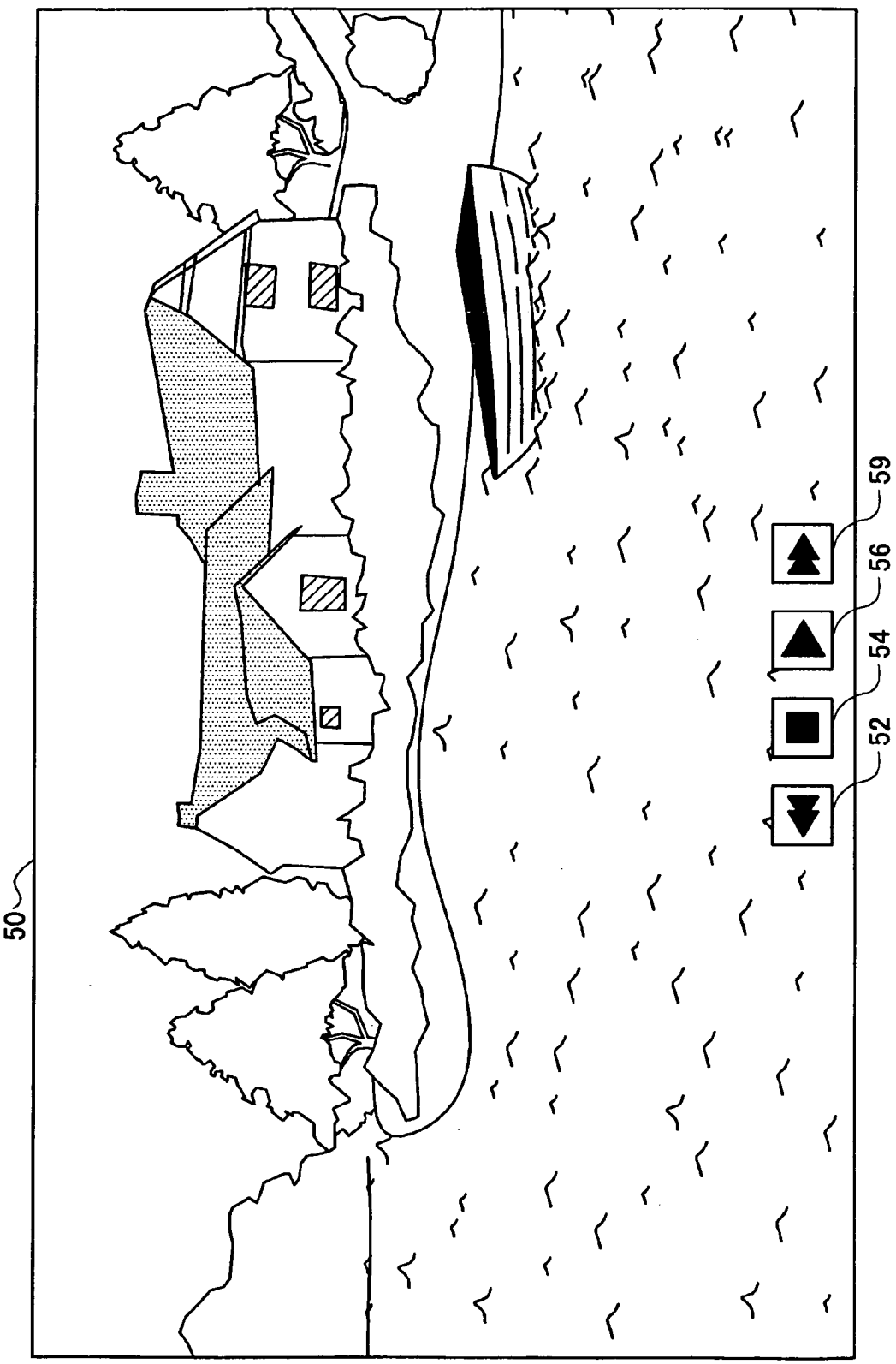
FIG. 11 is an explanatory diagram showing an example of a playback screen.

Then, when the play button 38B is selected by the user at time t3, the decoder 256 and the display screen generation section 228 start to generate, in cooperation with each other, a playback screen 50 as shown in FIG. 11, for example (S332). Here, in the schematic diagram of FIG. 8, the black line indicates the data amount already played back where the playback is actually started.

FIG. 11 is an explanatory diagram showing an example of the playback screen 50. As shown in FIG. 11, the playback screen 50 includes a rewind button 52, a pause button 54, a play button 56, and a fast-forward button 59. The rewind button 52 is displayed when there is data already played back. Also, the fast-forward button 59 is displayed when it is determined by the determination section 244 that the playback will be completed without the data playback position catching up with the data download position when shifted from fast-forwarding of content data ranging over a predetermined time or more to playback at a normal rate.

The rewind button 52, the pause button 54, the play button 56, and the fast-forward button 59 are each user-selectable, and function as playback control items for instructing the playback control of the content data. Also, these playback control items are added to the playback screen 50 by the display screen generation section 228.

Then, when the fast-forward button 59 is selected by the user at time t4, the decoder 256 starts fast-forwarding of the content data (S332). When the fast-forwarding is started, the rate of the data amount which will be already downloaded increases, and thus the gradient of the black line indicating the data amount already downloaded, which was parallel to the dotted line, becomes steep along the horizontal direction as shown in the schematic diagram of FIG. 8.

Furthermore, when the play button 56 is selected by the user at time t5, the decoder 256 stops the fast-forwarding and shifts to normal playback (S340). Then, as shown in the schematic diagram of FIG. 8, the gradient of the black line indicating the data amount already downloaded becomes gradual along the horizontal direction and parallel to the dotted line.

Then, the download of the content data "Town by the Lake" is completed at time t6 (S344), and subsequently the playback of the content data "Town by the Lake" is completed at time t7 (S348). In this manner, since the play button 56 is displayed upon a time proper playback becomes possible, when the play button 56 is selected by the user, the receiver 20 according to the embodiment can properly playback the corresponding content data to the end.

Additionally, in the above, an example has been described where the play button 38B is not included in the content list screen 30 until time t2, which is when the data playback position of the content data "Town by the Lake" will no longer catch up with the data download position, is reached. However, the embodiment is not limited to such an example. For example, the play button 38B may be differentiated from other play buttons 38A and 38D by the display format, such as color, density, transparency, size, and the like, until time t2 is reached.

Figure 12:
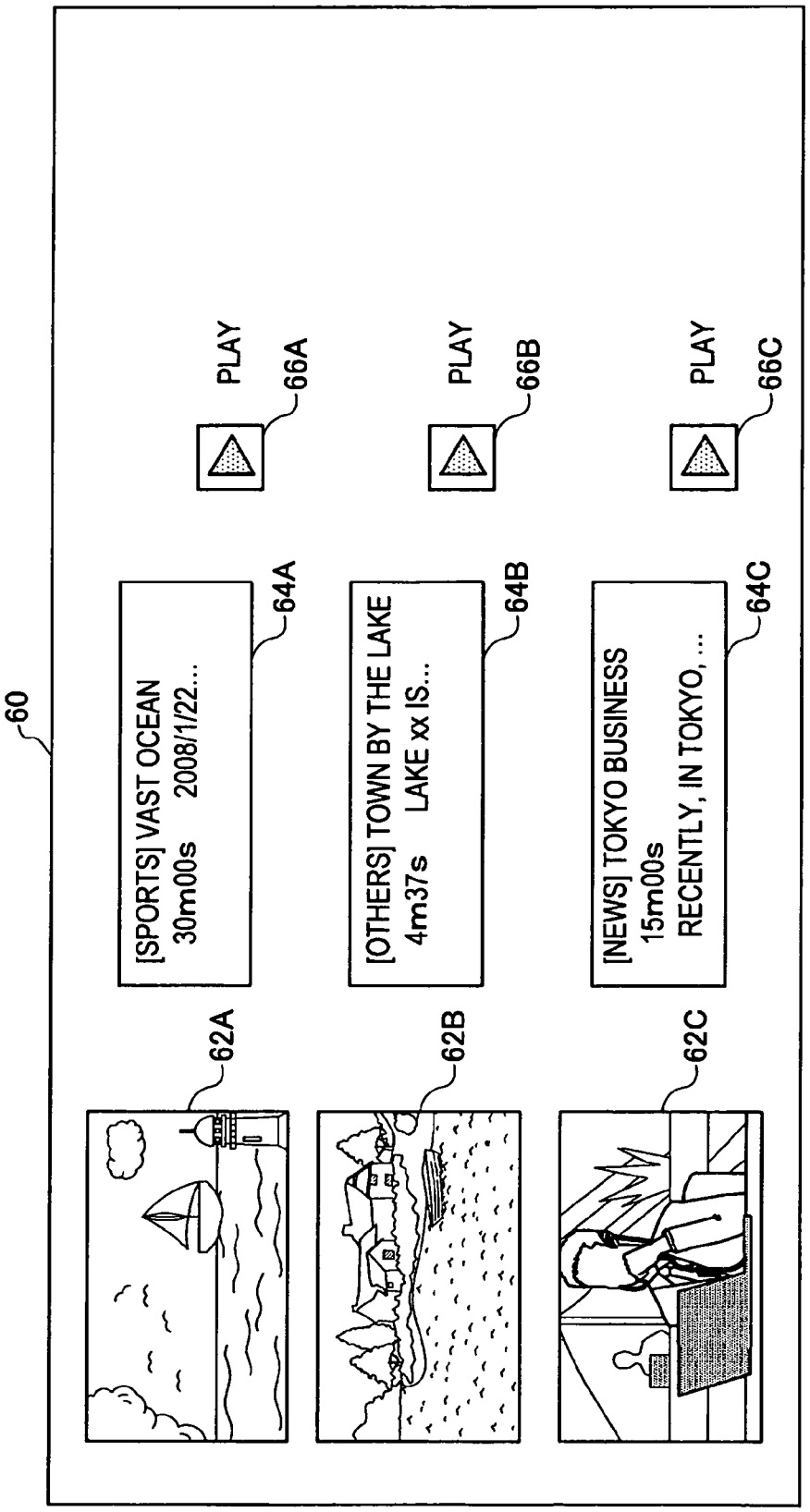
FIG. 12 is an explanatory diagram showing an example of a playlist screen generated by the display screen generation section.

Furthermore, in response to a request from the user, the display screen generation section 228 can also generate a playlist screen 60 as shown in FIG. 12 showing content data currently capable of being played back.

FIG. 12 is an explanatory diagram showing an example of the playlist screen 60 generated by the display screen generation section 228. More specifically, FIG. 12 shows the playlist screen 60 generated by the display screen generation section 228 at time t2 or later shown in FIG. 8. As shown in FIG. 12, the playlist screen 60 generated by the display screen generation section 228 at time t2 or later includes a thumbnail 62A, summary information 64A and a play button 66A for the content data "Vast Ocean." Similarly, the playlist screen 60 includes a thumbnail 62B, summary information 64B and play button 66B for the content data "Town by the Lake," and a thumbnail 62C, summary information 64C and a play button 66C for the content data "Tokyo Business."

The user can make the receiver 20 start playback of desired content data by selecting the play button 66 for the content data whose playback is desired. Additionally, before time t2, the display screen generation section 228 generates a playlist 60 not including the display relating to the content data "Town by the Lake."

Furthermore, although a case where the download rate of content data is slower than the playback rate has been described in FIG. 8, a case can also be assumed where the download rate of content data is faster than the playback rate. An operation example for a case as described where the download rate of content data is faster than the playback rate is shown in FIG. 13.

Figure 13:
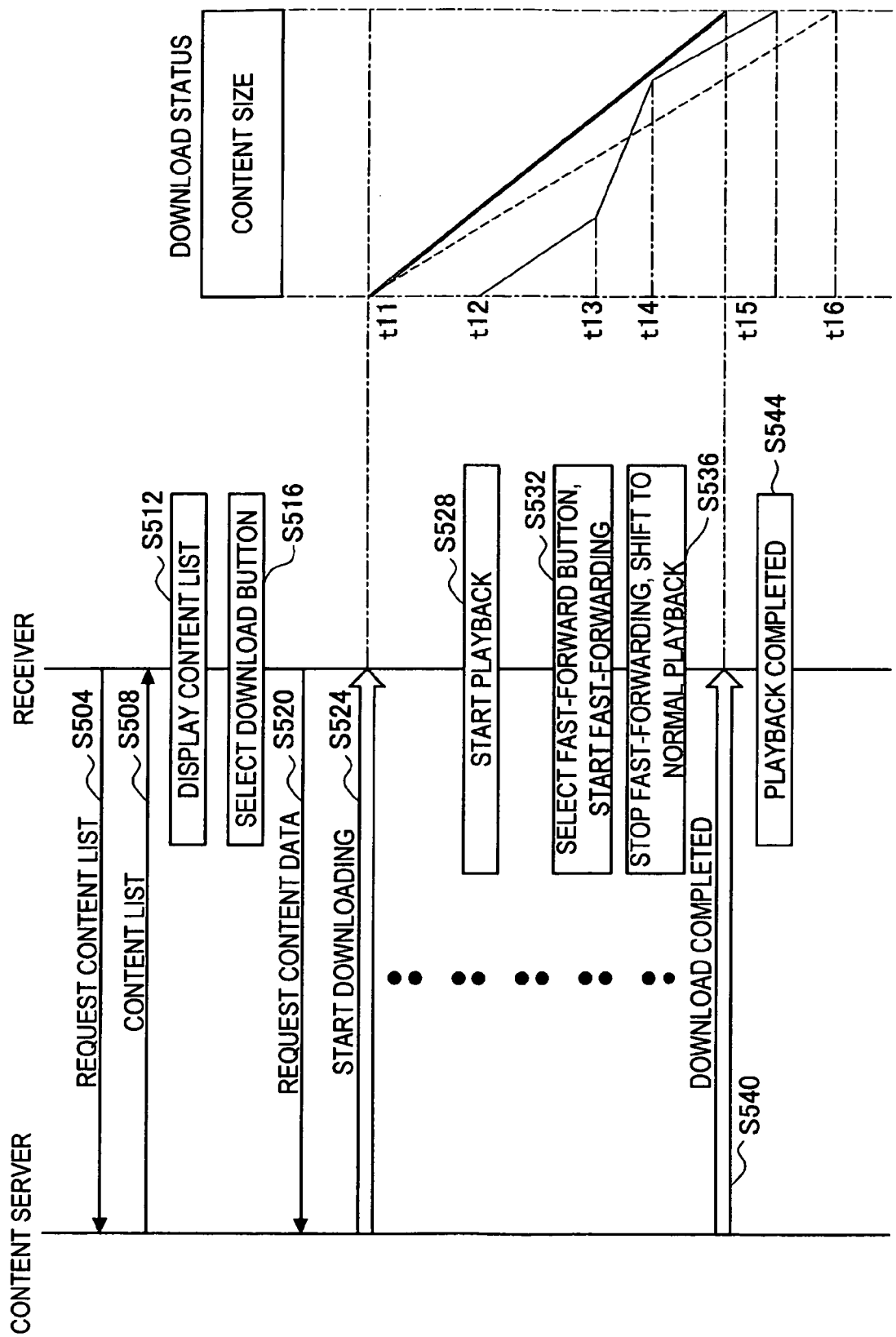
FIG. 13 is a sequence diagram showing another flow of the processing for a case where a download rate of the content data "Town by the Lake" is faster than a playback rate.

FIG. 13 is a sequence diagram showing another flow of the processing for a case where the download rate of the content data "Town by the Lake" is faster than the playback rate. As shown in FIG. 13, first, based on a user operation, the content list acquisition section 224 of the receiver 20 requests the content server 10 for the transmission of a content list (S504). When requested for a content list by the receiver 20, the content server 10 transmits metadata stored in the storage section 110 to the receiver 20 as the content list (S508).

Then, when the content list is acquired by the content list acquisition section 224, the display screen generation section 228 generates the content list screen 30 and has it displayed by the display device 22 (S512). Here, since the download rate of the content data "Town by the Lake" is faster than the playback rate, the content list screen 30 generated by the display screen generation section 228 includes the play button for the content data "Town by the Lake." Subsequently, when the download button 36B for the content data "Town by the Lake" is selected by the user (S516), the download section 248 requests the content server 10 for the transmission of the content data "Town by the Lake" (S520). In response to the request from the receiver 20, the content server 10 starts the transmission of the content data "Town by the Lake" at time 11 (S524).

As shown in the schematic diagram in FIG. 13, since the download rate of the content data "Town by the Lake" is faster than the playback rate, the gradient of the double line indicating the data amount already downloaded is steeper, along the horizontal direction, than the gradient of the dotted line indicating the data amount which would be already played back if the playback is started at time t11.

Subsequently, when the play button for the content data "Town by the Lake" is selected by the user at time t12, the decoder 256 starts the playback of the data already downloaded (S528). However, since the margin of the data amount already downloaded is small at this point and the time allowing for fast-forwarding is not sufficiently secured, the determination section 244 does not make the display screen generation section 228 display the fast-forward button.

Then, when time t3, which is when the margin of the data amount already downloaded in relation to the data amount already played back becomes sufficient, is reached, the determination section 244 makes the display screen generation section 228 display the fast-forward button (S532). If, at the same time, the fast-forward button is selected by the user and the fast-forwarding is started by the decoder 256, the gradient of the black line indicating the data amount which is already actually played back is steeper, along the horizontal direction, than the gradient of the double line indicating the data amount already downloaded.

When a data fast-forward position catches up with the data download position at time t14, or when the difference between the remaining download time and the remaining playing time falls below a standard time, the determination section 244 makes the decoder 256 end the fast-forwarding and shift to the normal playback (S536). Then, the download of the content data "Town by the Lake" is completed (S540), and the playback of the content data "Town by the Lake" is completed at time t15, which is after the completion of download (S544).

The operations of the receiver 20 according to the embodiment described above are shown together in FIG. 14.

Figure 14:
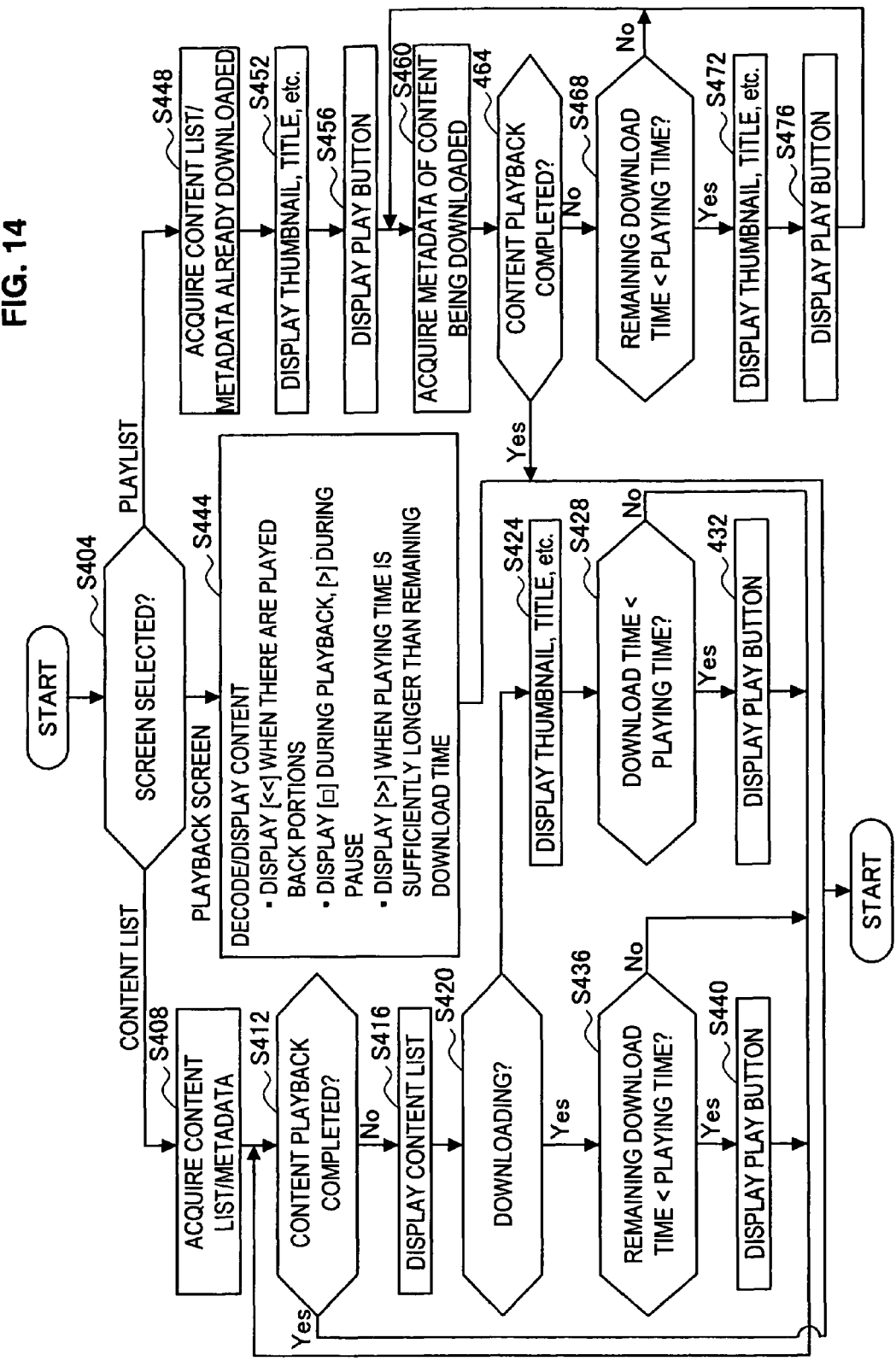
FIG. 14 is a flow chart showing a flow of a display generation method to be executed in the receiver according to the embodiment.

FIG. 14 is a flow chart showing a flow of a display generation method to be executed in the receiver 20 according to the embodiment. As shown in FIG. 14, first, when display of a content list screen is requested by the user (S404), the content list acquisition section 224 acquires a content list (metadata) from the content server 10 (S408). Then, the display screen generation section 228 generates a content list screen based on the content list acquired by the content list acquisition section 224 and has it displayed by the display device 22 (S416).

Subsequently, if certain content data is not currently being downloaded (S420), the display screen generation section 228 generates a content list screen including the download button for the content data and has it displayed by the display device 22 (S424). Then, the determination section 244 determines the relationship between the remaining download time and the playing time of the content data (S428), and when the playing time is longer than the download time, the determination section 244 makes the display screen generation section 228 display the play button (S432).

On the other hand, if certain content data is currently being downloaded, the determination section 244 determines the relationship between the remaining download time and the playing time of the content data (S436), and when the playing time is longer than the remaining download time, the determination section 244 makes the display screen generation section 228 display the play button (S440). After the processes of S432 and S440, when the playback of the content data is complete, the series of processes is ended, and when the playback of the content data is not complete, the process is repeated from S416 (S412).

Furthermore, when the play button is selected by the user, the decoder 256 plays back the content data corresponding to the selected play button, and the display device 22 displays a playback screen to which the playback control item is added by the display screen generation section 228 (S444). At this time, the display screen generation section 228 adds, to the playback screen, the rewind button if there is content data already played back, the pause button if during playback, the play button if during pause, and the fast-forward button if there is a margin of playing time in relation to the remaining download time.

Furthermore, when display of the playlist screen is requested by the user, the display screen generation section 228 acquires the content list (S448) indicating a list of content data already downloaded (S448), and generates a playlist including the thumbnail or title of each content data (S452). Moreover, the display screen generation section 228 adds the play button corresponding to each content data to the playback screen and has it displayed by the display device 22.

Subsequently, the determination section 244 acquires the metadata of the content data being downloaded (S460). Then, the determination section 244 determines the relationship between the remaining download time and the playing time of the content data being downloaded. The display screen generation section 228 generates a playlist screen including the thumbnail and title of the content data for which determination section 244 determined that the playing time is longer than the remaining download time (S472), and further, adds the play button corresponding to the content data to the playlist screen and has it displayed by the display device 22 (S476). Then, when the playback of the content is not complete, the process is repeated from S468 (S464).

(3-3) Modified Example of Receiver

Heretofore, the configuration and operation of the receiver 20 according to the embodiment have been described. Since this receiver 20 includes the connecting section 232 to be connected to the display device 22, the receiver 20 can be connected with any display device in a wired or wireless manner, and the connected display device can be made to display a display screen generated by the display screen generation section 228. Accordingly, an existing display device can also be made to display the display screen generated by the display screen generation section 228 if the existing display device is connected with the receiver 20. However, the present invention is not limited to the receiver 20 including the connecting section 232 to be connected to the display device 22. According to the present invention, a receiver 21 with a built-in display section 260 shown in FIG. 15, for example, is also provided.

FIG. 15 is a function block diagram showing a configuration of the receiver 21 according to a modified example. As shown in FIG. 15, the receiver 21 according to the modified example includes the communication section 216, the operation detection section 220, the content list acquisition section 224, the display screen generation section 228, the transmission bandwidth measuring section 236, the data amount acquisition section 240, the determination section 244, the storage section 252, the decoder 256, and the display section 260. The functions of the communication section 216, the operation detection section 220, the content list acquisition section 224, the display screen generation section 228, the transmission bandwidth measuring section 236, the data amount acquisition section 240, the determination section 244, the storage section 252, and the decoder 256 are as described in "(3-2) Functions of content server and receiver," and the explanations thereof will be omitted.

The display section 260 displays various display screens, such as a content list screen, a playlist screen, a playback screen, and the like, generated by the display screen generation section 228. Accordingly, the receiver 21 according to the modified example does not have to include the connecting section 232 for connecting with the display device 22. As a result, the number of devices required to realize the present invention that are configured physically separately can be restricted, and cables connecting the devices can also be reduced.

(4) Conclusion

As described above, the receiver 20 or 21 according to the embodiment includes the determination section 244 for determining the relationship between the remaining download time, obtained based on the data amount not yet downloaded by the download section 248 as well as the transmission rate, and the playing time of the content data. Furthermore, when the determination section 244 determines that the remaining download time fell below the playing time of the content data, the display screen generation section 228 generates a display screen including, as the playback control item, a play button for instructing the playback of the content data.

Here, it can be assumed that, when the playback of the content data is started after the remaining download time fell below the playing time of the content data, the data playback position of the content data will not catch up with the data download position and the playback can be performed to the end without any interruption. Accordingly, the display screen generation section 228 can generate a display screen including a play button after the content data becomes capable of being played back to the end without any interruption. As a result, cases can be suppressed where a situation not intended by the user occurs, such as playback being not started or being interrupted even though the user desired a proper playback of the content data and selected the play button.

Heretofore, preferred embodiments of the present invention have been described in detail with reference to the appended drawings. However, it is needless to say that the present invention is not limited to such examples. It is apparent that various alterations or modifications within the spirit of the claims will readily occur to those skilled in the art, and it is to be understood that these will naturally fall within the technical scope of the present invention.

For example, an example has been described in the above where the determination section 244 calculates the remaining download time by dividing the data amount not yet downloaded supplied from the data amount acquisition section 240 by the transmission rate of the content data supplied from the transmission bandwidth measuring section 236, and determines the relationship in terms of length between the remaining download time and the playing time. However, the present invention is not limited to such an example. The transmission rate of the content data possibly changes according to the state of the communication network 11 or the operation state of the content server 10. Accordingly, to absorb the change in the transmission rate, the determination section 244 may also calculate the remaining download time by adding a predetermined data amount to the data amount not yet downloaded supplied from the data amount acquisition section 240 and dividing the value obtained by the addition by the transmission rate of the content data. According to this configuration, since the display screen generation section 228 displays the play button in a case where the proper playback can be guaranteed even if the transmission rate temporarily decreases, the receiver 20 can more surely realize the operation intended by the user.

Furthermore, an example has been described in the above where the determination section 244 calculates the remaining download time by dividing the data amount not yet downloaded supplied from the data amount acquisition section 240 by the transmission rate of the content data supplied from the transmission bandwidth measuring section 236, and determines the relationship between the remaining download time and the remaining playing time. However, the present invention is not limited to such an example. Similarly to the above, the transmission rate of the content data possibly changes according to the state of the communication network 11 or the operation state of the content server 10. Accordingly, to absorb the change in the transmission rate, the determination section 244 may also calculate the remaining download time by adding a predetermined data amount to the data amount not yet downloaded supplied from the data amount acquisition section 240 and dividing the value obtained by the addition by the transmission rate of the content data.

Furthermore, an example has been described in the above where the display screen generation section 228 displays the play button when the playing time is determined by the determination section 244 to be longer than the remaining download time. However, the present invention is not limited to such an example. For example, when the decoder 256 is being used for another purpose, a proper playback cannot be performed even if the playing time is longer than the remaining download time. Accordingly, when the decoder 256 cannot be used, the display screen generation section 228 does not display the play button even if the playing time is determined by the determination section 244 to be longer than the remaining download time, or may display the play button distinctively from other buttons.

Additionally, to convert the format of content data stored in the storage section 252, the content data needs to be re-decoded after encoding. Accordingly, while the format of content data stored in the storage section 252 is being converted, since the decoding is being used, the display screen generation section 228 does not display the play button or may display the play button distinctively from other buttons.

Furthermore, each step of the processing by the receiver 20 of this specification does not have to be performed in a time series in the order described as the flow charts. For example, each step of the processing by the receiver 20 may include processing that is performed in parallel or individually (for example, parallel processing or object oriented processing).

Furthermore, a computer program can be created that directs hardware such as the CPU 201, the ROM 202, the RAM 203 and the like built into the receiver 20 to fulfill functions corresponding to each of the configurations of the receiver 20 described above. Furthermore, a storage medium on which the computer program is stored is also provided. Furthermore, by configuring each function block shown in the function block diagrams of FIGS. 5 and 15 as hardware, the series of processes can also be realized by the hardware.

What is claimed is:

1. A display generation device for generating a display screen including one or two or more user-selectable playback control items, comprising:
   one or more processors configured as:
   a download section for downloading content data desired by a user of the display generation device from a content server storing the content data;
   a data amount acquisition section for acquiring a data amount already downloaded and a data amount not yet downloaded by the download section among the content data;
   a rate acquisition section for estimating, prior to start of the downloading of the content data desired by the user, a transmission rate of data from the content server to the display generation device, wherein the rate acquisition section estimates the transmission rate of data based on a data transmission rate between the content server and another receiver different than the display generation device; and a display screen generation section for generating the display screen including the playback control item according to the data amount acquired by the data amount acquisition section and the transmission rate estimated by the rate acquisition section, wherein the display screen generation section calculates a remaining download time by adding a predetermined data amount to the data amount not yet downloaded to generate a sum and dividing the sum by the transmission rate estimated by the rate acquisition section.

2. The display generation device according to claim 1, wherein:

the display generation device further includes a determination section for determining a relationship between remaining download time obtained based on the data amount not yet downloaded by the download section, the estimated transmission rate, and playing time of the content data, and the display screen generation section generates the display screen including, as the playback control item, a playback instruction item for instructing playback of the content data only when the determination section determines that the remaining download time fell below the playing time of the content data.

3. The display generation device according to claim 2, wherein the remaining download time is longer by a predetermined time than a time obtained by dividing the data amount not downloaded by the download section by the estimated transmission rate.

4. The display generation device according to claim 2, further comprising:

a playback section for playing back the content data downloaded by the download section, wherein:

the determination section determines, during the playback of the content data by the playback section, a relationship between remaining playing time of the content data and the remaining download time, and the display screen generation section generates the display screen including, as the playback control item, a fast-forward instruction item for instructing fast-forwarding of the content data when the determination section determines that the remaining playing time is longer by a predetermined time or more than the remaining download time.

5. The display generation device according to claim 4, wherein:

the determination section determines, during the fast-forwarding of the content data, a relationship between the remaining playing time of the content data and the remaining download time, and the playback section stops the fast-forwarding of the content data when the determination section determines that difference between the remaining playing time and the remaining download time fell below a standard time.

6. The display generation device according to claim 2, further comprising:

a playback section for playing back the content data downloaded by the download section, wherein the display screen generation section generates, when the playback section is being used, the display screen not including the playback instruction item even when the determination section determines that the remaining download time fell below the playing time of the content data.

7. The display generation device according to claim 2, wherein the display generation device further includes a display section for displaying the display screen generated by the display screen generation section.

8. The display generation device according to claim 2, wherein the display generation device further includes a connecting section to be connected to a display device for displaying the display screen generated by the display screen generation section.

9. The display generation device according to claim 2, wherein:

the playback control item includes the playback instruction item for instructing playback of the content data, and the display screen generation section generates a menu screen including the playback instruction item.

10. The display generation device according to claim 2, wherein:

the playback control item includes a fast-forward instruction item for instructing fast-forwarding of the content data, and the display screen generation section adds the fast-forward instruction item to a playback screen of the content data downloaded by the download section.

11. A computer-implemented display generation method to be executed by a processor in a display generation device for generating a display screen including one or two or more user-selectable playback control items, comprising the steps of:

downloading content data desired by a user from a content server storing the content data;

acquiring a data amount already downloaded and a data amount not yet downloaded among the content data;

estimating, using the processor, a transmission rate of data from the content server to the display generation device prior to start of the step of downloading the content data desired by the user from the content server, wherein the transmission rate is estimated based on a data transmission rate between the content server and another receiver different than the display generation device; and generating the display screen including the playback control item according to the data amount already downloaded, the data amount not yet downloaded and the transmission rate estimated by the rate acquisition section, wherein generating the display screen comprises calculating a remaining download time by adding a predetermined data amount to the data amount not yet downloaded to generate a sum and dividing the sum by the transmission rate estimated in the estimating step.

12. A computer-readable medium storing a program for causing a computer provided in a display generation device for generating a display screen including one or two or more user-selectable playback control items to function as:

a download section for downloading content data desired by a user from a content server storing the content data;

a data amount acquisition section for acquiring a data amount already downloaded and a data amount not yet downloaded by the download section among the content data;

a rate acquisition section for estimating, prior to start of the downloading of the content data desired by the user, a transmission rate of data from the content server to the display generation device, wherein the rate acquisition section estimates the transmission rate of data based on a data transmission rate between the content server and another receiver different than the display generation device; and a display screen generation section for generating the display screen including the playback control item according to the data amount acquired by the data amount acquisition section and the transmission rate estimated by the rate acquisition section, wherein the display screen generation section calculates a remaining download time by adding a predetermined data amount to the data amount not yet downloaded to generate a sum and dividing the sum by the transmission rate estimated by the rate acquisition section.

13. A content download system including a display generation device for generating a display screen including one or two or more user-selectable playback control items and a content server capable of communication with the display generation device, wherein:

the content server has content data stored in a storage medium, and the display generation device includes:

a download section for downloading the content data from the content server, a data amount acquisition section for acquiring a data amount already downloaded and a data amount not yet downloaded by the download section among the content data, a rate acquisition section for estimating, prior to start of the downloading of the content data, a transmission rate of data from the content server to the display generation device, wherein the rate acquisition section estimates the transmission rate of data based on a data transmission rate between the content server and another receiver different than the display generation device, and a display screen generation section for generating the display screen including the playback control item according to the data amount acquired by the data amount acquisition section and the transmission rate estimated by the rate acquisition section, wherein the display screen generation section calculates a remaining download time by adding a predetermined data amount to the data amount not yet downloaded to generate a sum and dividing the sum by the transmission rate estimated by the rate acquisition section.

\* \* \* \* \*